US008887268B2

(12) United States Patent
Uchida et al.

(10) Patent No.: US 8,887,268 B2
(45) Date of Patent: Nov. 11, 2014

(54) ELECTRONIC DEVICE, PASSWORD CONTROL METHOD, AND PROGRAM

(75) Inventors: Osamu Uchida, Kanagawa (JP); Kazuya Fujimura, Kanagawa (JP); Yutaka Kobayashi, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 736 days.

(21) Appl. No.: 12/675,255

(22) PCT Filed: Sep. 5, 2007

(86) PCT No.: PCT/JP2007/067328
§ 371 (c)(1),
(2), (4) Date: Feb. 25, 2010

(87) PCT Pub. No.: WO2009/031215
PCT Pub. Date: Mar. 12, 2009

(65) Prior Publication Data
US 2010/0313263 A1    Dec. 9, 2010

(51) Int. Cl.
*H04L 29/06*    (2006.01)
*G06F 21/79*    (2013.01)

(52) U.S. Cl.
CPC .................................... *G06F 21/79* (2013.01)
USPC ............................................ 726/18; 713/182

(58) Field of Classification Search
CPC .. G06F 21/79; G06F 21/31; G06F 2221/2131
USPC ............................................ 726/18; 713/182
See application file for complete search history.

(56) References Cited

U.S. PATENT DOCUMENTS

| | | | | |
|---|---|---|---|---|
| 5,282,247 A | * | 1/1994 | McLean et al. | 711/164 |
| 6,141,563 A | * | 10/2000 | Miller et al. | 455/558 |
| 6,286,087 B1 | * | 9/2001 | Ito et al. | 711/164 |

(Continued)

FOREIGN PATENT DOCUMENTS

| | | |
|---|---|---|
| EP | 1274000 A1 | 1/2003 |
| JP | 03-192456 A | 8/1991 |

(Continued)

OTHER PUBLICATIONS

European Search Report for PCT/JP2007067328 dated Aug. 5, 2011.

(Continued)

*Primary Examiner* — Michael Pyzocha
(74) *Attorney, Agent, or Firm* — Pearne & Gordon LLP

(57) ABSTRACT

There is provided an electronic device capable of safely obtaining password information even when a password of an external storage device of any type is forgotten. An electronic device 100 includes an external memory card connection unit 108 connecting a memory card 200 capable of being locked by a card password, a password retention unit 101 retaining the password information including the card password, a device password retention unit 112 retaining a device password of the electronic device 100, an input unit 102 for inputting data, a device setting cancellation unit 111 determining whether or not the device password inputted by the input unit 102 and the device password retained in the device password retention unit 112 match with each other, and a control unit 109 outputting the password information or changing the card password of the external storage device set in the external storage device when the device passwords match with each other as a result of the determination.

13 Claims, 19 Drawing Sheets

(56) References Cited

U.S. PATENT DOCUMENTS

| | | | |
|---|---|---|---|
| 6,729,550 B2 * | 5/2004 | Seita et al. | 235/492 |
| 7,698,733 B2 | 4/2010 | Kutaragi et al. | |
| 7,904,237 B2 * | 3/2011 | Amano et al. | 701/400 |
| 2001/0017584 A1 | 8/2001 | Shinzaki | |
| 2001/0037459 A1 * | 11/2001 | Ogawa et al. | 713/200 |
| 2001/0039620 A1 * | 11/2001 | Berry et al. | 713/193 |
| 2002/0129262 A1 | 9/2002 | Kutaragi et al. | |
| 2003/0006280 A1 * | 1/2003 | Seita et al. | 235/380 |
| 2004/0133812 A1 * | 7/2004 | Ohmori et al. | 713/202 |
| 2004/0268074 A1 * | 12/2004 | Yagi | 711/164 |
| 2005/0071660 A1 * | 3/2005 | Shimizu et al. | 713/193 |
| 2006/0080562 A1 * | 4/2006 | Ooshima et al. | 713/300 |
| 2006/0085845 A1 * | 4/2006 | Davis et al. | 726/6 |
| 2006/0135123 A1 * | 6/2006 | Jo | 455/410 |
| 2006/0230285 A1 | 10/2006 | Takao | |
| 2007/0083772 A1 * | 4/2007 | Harada et al. | 713/193 |
| 2007/0174618 A1 * | 7/2007 | Nakano et al. | 713/171 |
| 2007/0220007 A1 * | 9/2007 | Narita et al. | 707/9 |
| 2008/0072058 A1 * | 3/2008 | Cedar et al. | 713/184 |
| 2008/0178281 A1 * | 7/2008 | Narayanaswami et al. | 726/17 |

FOREIGN PATENT DOCUMENTS

| | | |
|---|---|---|
| JP | 10-187903 A | 7/1998 |
| JP | 2001-236324 A | 8/2001 |
| JP | 2002-352194 A | 12/2002 |
| JP | 2004-133670 A | 4/2004 |
| JP | 2005-222095 A | 8/2005 |
| JP | 2006-293745 A | 10/2006 |

OTHER PUBLICATIONS

International Search Report for PCT/JP2007/067328 Aug. 8, 2011.

* cited by examiner (a)

(b)

ELECTRONIC DEVICE, PASSWORD CONTROL METHOD, AND PROGRAM

TECHNICAL FIELD

The present invention relates to an electronic device, a password control method, and a program, and particularly, to an electronic device, a password control method, and a program which are capable of safely obtaining password information when a password of an external storage medium capable of being locked by the password is forgotten.

BACKGROUND ART

Conventionally, it is possible to easily carry various information by using a memory card such as an SD card or the like. By connecting the memory card to an electronic device, it is possible to import various information stored in the memory card into the electronic device to perform processing in the electronic device. In addition, various information can be written into the memory card.

In recent years, with an increase in the capacity of the memory card, personal information and secret information are increasingly stored in the memory card. In addition, with enhanced awareness of security of a user using the memory card, there exists a memory card requiring an input of a password in order to refer to and update information in the memory card, and newly store information in the memory card.

For example, there is adopted a system in which the information in the memory card can be freely accessed when the password is not set in the memory card, but the memory card is brought into a locked state unless correct password information is transmitted to the memory card so that the information in the memory card can not be accessed when the password is set in the memory card. Thus, when the memory card is in the locked state, by transmitting the correct password information to the memory card to bring the memory card into an unlocked state, the information in the memory card can be accessed.

In the memory card requiring the input of the password, when the password is forgotten, it becomes impossible to read stored data protected by the password, update a storage area protected by the password, and newly write data in the storage area. In addition, also in the electronic device such as a PC or the like to which the memory card is connected, it becomes impossible to use (read and write) the memory card.

Consequently, there is known an information device in which a sub-password is provided in addition to an actual password, and the password is cleared or redisplayed by using the sub-password when the actual password is forgotten (see, e.g., Patent Document 1).

In addition, there is known a password control method in which a password is generated by a system and stored in a storage medium for a user to prevent the password from being forgotten by the user, allow use of a complicated password, and improve safety of the system (see, e.g., Patent Document 2).

Patent Document 1: JP-2004-133670A
Patent Document 2: JP-3-192456A

DISCLOSURE OF THE INVENTION

Problem to be Solved by the Invention

However, in the information device of Patent Document 1, a target to be protected by the password (e.g., an external storage device such as the memory card or the like) needs to be capable of being provided with the sub-password and cope with unlocking of a password lock using the sub-password.

Further, in the password control method of Patent Document 2, automatic generation of the password can not be performed in the external storage device such as, e.g., the SD card or the like, the type of the external storage device to which the method can be applied is limited.

The present invention has been achieved in view of the above-described circumstances, and an object thereof is to provide an electronic device, a password control method, and a program which are capable of safely obtaining password information even when a password of an external storage device of any type is forgotten.

Means for Solving Problem

In order to achieve the above object, there is provided an electronic device according to a first aspect of the present invention including: an external storage device connection part connecting an external storage device capable of being locked by a password; a password retention part retaining password information including the password of the external storage device; a user authentication key retention part retaining a user authentication key of the electronic device; an input part for inputting data; a user authentication key determination part determining whether or not a user authentication key of the electronic device inputted by the input part and the user authentication key retained in the user authentication key retention part match with each other; and an output change part outputting the password information or changing the password of the external storage device which is set in the external storage device when the user authentication keys match with each other as a result of the determination by the user authentication key determination part.

With this configuration, even when the password of the external storage device of any type is forgotten, it is possible to safely obtain the password information on the external storage device or change the password information on the external storage device.

The electronic device according to a second aspect of the invention is configured in that the output change part outputs all of the password information retained in the password retention part.

With this configuration, even when the password of the external storage device of any type is forgotten, it is possible to safely obtain the password information on all of the external storage devices stored in the electronic device.

The electronic device according to a third aspect of the invention is configured in that the password retention part associates identification information on the external storage device with the password thereof and retains them as the password information.

With this configuration, an identification ID of the external storage device such as the memory card or the like and the password of the external storage device are associated with each other so that it becomes easy to recognize, e.g., which memory card the password of the external storage device to be outputted corresponds to.

The electronic device according to a fourth aspect of the invention is configured in that the output change part refers to the password retention part and outputs the password information in correspondence to the identification information on the external storage device connected to the external storage device connection part.

With this configuration, since it becomes possible to output only the password information in correspondence to the currently connected external storage device, it becomes possible to easily ascertain the password of the external storage device needed by the user.

The electronic device according to a fifth aspect of the invention is configured by further including an output mode selection part selecting any one of a first output mode for outputting all of the password information retained in the password retention part and a second output mode for outputting the password information on the external storage device connected to the external storage device connection part.

With this configuration, it becomes possible to select whether the password information on all of the external storage devices is outputted or only the password in correspondence to the connected external storage device is outputted so that convenience for the user is improved.

The electronic device according to a sixth aspect of the invention is configured in that the output change part suspends outputting of the password information when the identification information on the external storage device connected to the external storage device connection part is not retained in the password retention part.

With this configuration, it becomes possible to perform the output of the password information only when the password retention part retains the password information in correspondence to the identification information.

The electronic device according to a seventh aspect of the invention is configured in that the output change part displays the password information on a display part when the user identification keys match with each other as the result of the determination by the user authentication key determination part.

With this configuration, even when the password of the external storage device of any type is forgotten, it is possible to ascertain the password by safely displaying the password information.

The electronic device according to an eighth aspect of the invention is configured in that the output change part transmits the password information when the user authentication keys match with each other as the result of the determination by the user authentication key determination part.

With this configuration, even when the password of the external storage device of any type is forgotten, it is possible to transmit the password information by various transmission methods, and ascertain and store the password information in other electronic devices.

The electronic device according to a ninth aspect of the invention is configured in that the output change part deletes the password of the external storage device set in the external storage device when the user authentication keys match with each other as the result of the determination by the user authentication key determination part.

With this configuration, even when the password of the external storage device is forgotten, since the password information on the external storage device set in the external storage device can be deleted, it becomes possible to use the external storage device again.

The electronic device according to a tenth aspect of the invention is configured in that, when the output change part fails in change of the password, the output change part deletes the password information of which the change of the password is unsuccessful retained in the password retention part.

With this configuration, for example, when the password information on the connected external storage device and the password information on the external storage device retained in the electronic device do not match with each other, it is possible to delete the password information retained in the password retention part of the electronic device and the output of wrong password information can be thereby prevented after the deletion.

The electronic device according to an eleventh aspect of the invention is configured in that the password information includes manufacturer information indicative of a manufacturer of the external storage device.

With this configuration, for example, even when the user can not ascertain which external storage device's password is outputted using only the identification information and the password, with an increase in the amount of information related to the external storage device, it becomes possible to ascertain the password information with enhanced ease.

The electronic device according to a twelfth aspect of the invention is configured in that the password information includes capacity information indicative of a capacity of the external storage device.

With this configuration, for example, even when the user can not ascertain which external storage device's password is outputted using only the identification information and the password, with the increase in the amount of information related to the external storage device, it becomes possible to ascertain the password information with enhanced ease.

The electronic device according to a thirteenth aspect of the invention is configured by further including a password record part recording, when the password is not set in the external storage device connected to the external storage device connection part and when the password is newly set in the external storage device by inputting the password by the input unit, the inputted password in the password retention part.

With this configuration, since the password information newly set in the external storage device is retained in the electronic device, even when the password information is forgotten afterward, it becomes possible to safely obtain the password information.

The electronic device according to a fourteenth aspect of the invention is configured by further including a password record part recording, when the password of the external storage device set in the external storage device is changed by the output change part, the changed password in the password retention part.

With this configuration, since the password information is retained in the electronic device when the password set in the external storage device is changed, even when the password information is forgotten afterward, it becomes possible to safely obtain the password information.

The electronic device according to a fifteenth aspect of the invention is configured by further including a password record part recording, when the password of the external storage device set in the external storage device connected to the external storage device connection part and the password inputted by the input part match with each other and unlocking of a password lock of the external storage device is successfully performed, the matching password in the password retention part.

With this configuration, for example, even when the password information retained in the electronic device is different from the password information on the connected external storage device, and when the external storage device on which the password information is not retained by the electronic device is connected, since the password information is retained in the electronic device when the password identical with the password information on the connected external storage device is inputted and the unlocking of the password lock of the external storage device is successfully performed, it becomes possible to safely obtain the password information even when the password information is forgotten afterward.

The electronic device according to a sixteenth aspect of the invention is configured by further including an IC card connection part connecting an IC card having the password retention part, and wherein the output change part or the password record part transmits an access signal for getting access to the IC card when any of data reference, data record, and data change is performed with respect to the password retention part of the IC card.

With this configuration, for example, even in a case where the IC card is inserted and used in another electronic device, it is possible to safely obtain the password information when the password of the external storage device is forgotten.

A password control method according to a first aspect of the present invention includes the steps of: determining whether or not a user authentication key of the electronic device inputted by an input part for inputting data and a user authentication key retained in a user authentication key retention part for retaining the user authentication key of the electronic device match with each other; and outputting password information including a password of an external storage device capable of being locked by the password or changing the password of the external storage device set in the external storage device when the user authentication keys match with each other as a result of the determination.

With this method, even when the password of the external storage device of any type is forgotten, it is possible to safely obtain the password information or change the password set in the external storage device.

A program according to a first aspect of the present invention is a program for causing a computer to execute the steps of: determining whether or not a user authentication key of the electronic device inputted by an input part for inputting data and a user authentication key retained in a user authentication key retention part for retaining the user authentication key of the electronic device match with each other; and outputting password information including a password of an external storage device capable of being locked by the password or changing the password of the external storage device set in the external storage device when the user authentication keys match with each other as a result of the determination.

With this program, even when the password of the external storage device of any type is forgotten, it is possible to safely obtain the password information or change the password set in the external storage device.

Advantageous Effect of the Invention

According to the present invention, there can be provided an electronic device, a password control method, and a program which are capable of safely obtaining password information or changing a password set in an external storage device even when the password of the external storage device of any type is forgotten.

Figure 1:
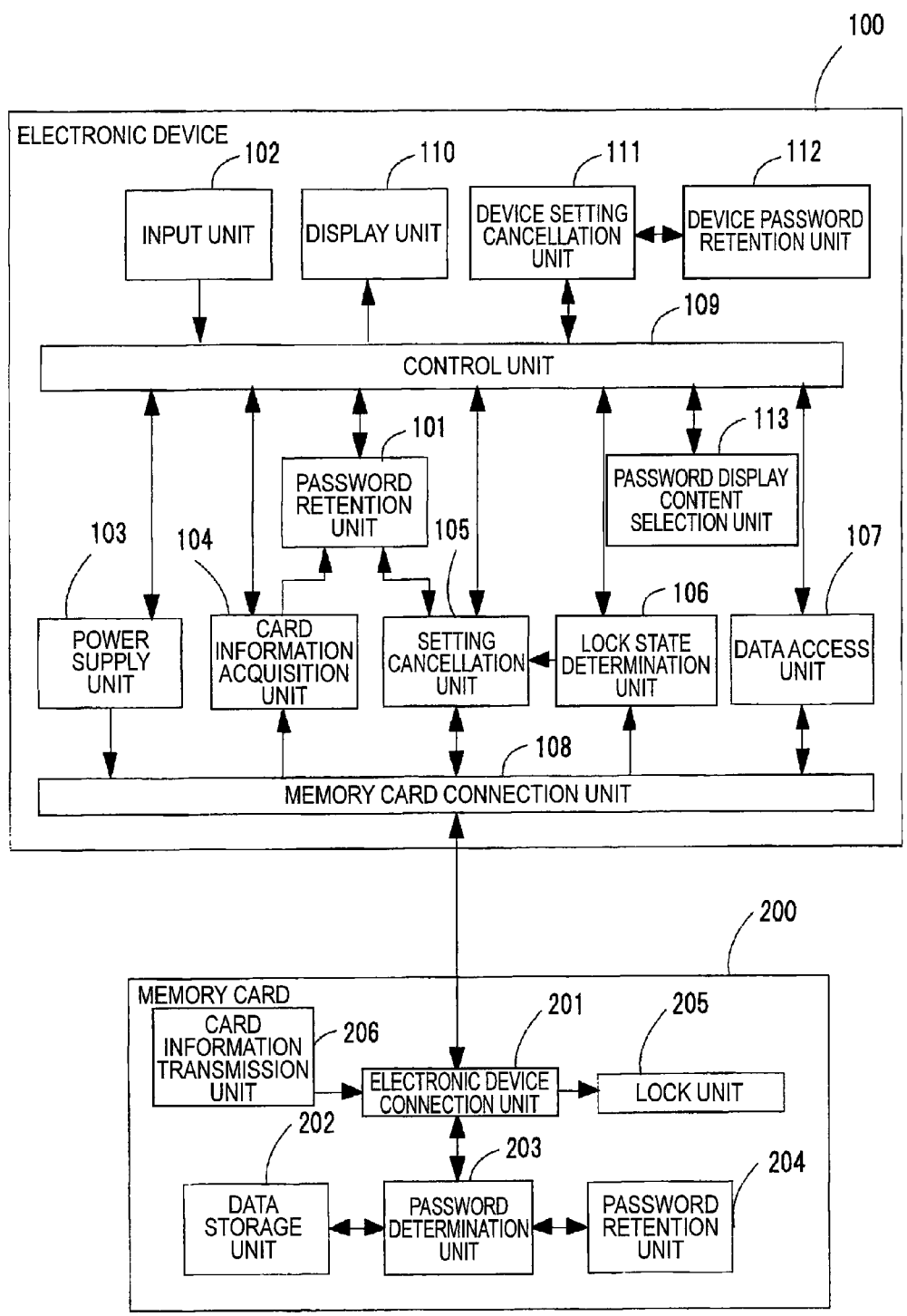
FIG. 1 shows an example of schematic configurations of an electronic device and a memory card in a first embodiment of the present invention.

EXPLANATIONS OF REFERENCE NUMERALS AND SIGNS 100, 100B, 100C electronic device
101 password retention unit
102 input unit
103 power supply unit
104 card information acquisition unit
105 setting cancellation unit 106 lock state determination unit
107 data access unit
108 memory card connection unit
109 control unit
110 display unit
111 device setting cancellation unit
112 device password retention unit
113 password display content selection unit
114 IC card connection unit
115 output unit
116 password output content selection unit
200 memory card
201 electronic device connection unit
202 data storage unit
203 password determination unit
204 password retention unit
205 lock unit
206 card information transmission unit
300 IC card
301 password retention unit
302 electronic device connection unit

BEST MODE FOR CARRYING OUT THE INVENTION

A description will be given hereinbelow of an electronic device, a password control method, and a program in embodiments of the present invention by using the drawings.

First Embodiment

FIG. 1 shows an example of schematic configurations of an electronic device 100 and a memory card 200 in a first embodiment of the present invention.

The electronic device 100 includes a password retention unit 101, an input unit 102, a power supply unit 103, a card information acquisition unit 104, a setting cancellation unit 105, a lock state determination unit 106, a data access unit 107, a memory card connection unit 108, a control unit 109, a display unit 110, a device setting cancellation unit 111, a device password retention unit 112, and a password display content selection unit 113. As the electronic device 100, there can be considered a PC, a PDA, a portable telephone terminal, a television, a digital still camera, a digital video camera, an IC recorder, a printer, an AV player, an AV recorder, an HDD portable storage, a car navigation terminal, and other electronic devices each to which an external storage device such as the memory card 200 or the like can be connected.

It is to be noted that the memory card connection unit 108 is an example of "an external storage device connection part". In addition, the device password retention unit 112 has a function as "a user authentication key retention part". Further, the device setting cancellation unit 111 has a function as "a user authentication key determination part". Moreover, the control unit 109 has functions as "an output change part" and "a password record part". Furthermore, the password display content selection unit 113 has a function as "an output mode selection part".

The memory card 200 includes an electronic device connection unit 201, a data storage unit 202, a password determination unit 203, a password retention unit 204, a lock unit 205, and a card information transmission unit 206. A description will be given herein of the memory card 200 as an example of the external storage device. Alternatively, as the external storage device, there can be considered a disk medium such as a hard disk, a DVD, or the like, a memory device such as a semiconductor memory device including an SSD (Solid State Drive), a USB memory, or the like, and also a virtual drive created in a file stored in the storage device. In addition, as the memory card 200, there can be considered an SD (Secure Digital) card, an MMC (Multi Media Card), a memory stick, an xD-picture card, a Compact Flash (registered trademark), and a SmartMedia.

Figure 2:
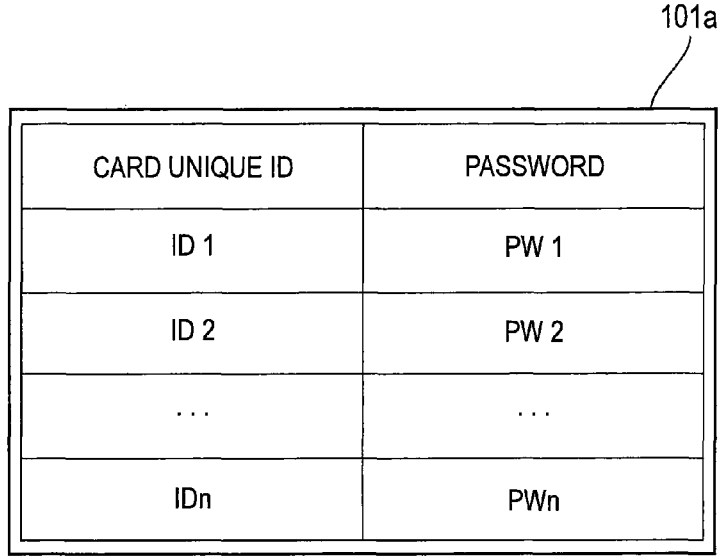
FIG. 2 shows examples of password tables retained in a password retention part in the first embodiment of the present invention.
Figure 2:
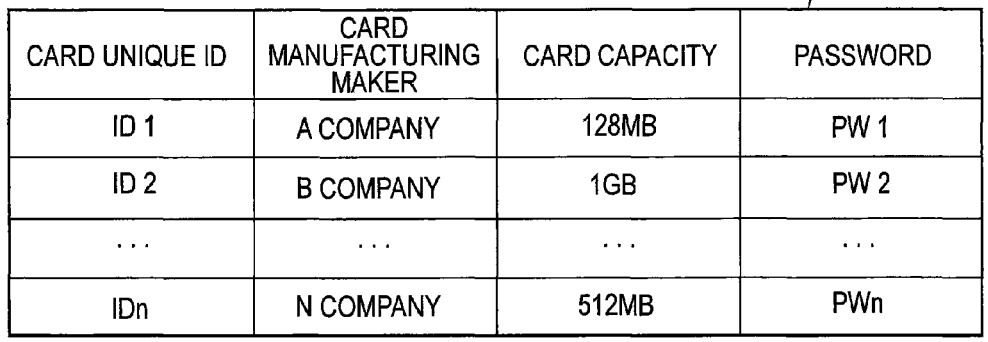

The password retention unit 101 retains a password of the memory card (hereinafter referred to as a card password) set by the setting cancellation unit 105. For example, the password retention unit 101 has a password retention table 101a or a password retention table 101b. In the password retention table 101a, a card unique ID for identifying the memory card 200 and the card password of the card are stored in association with each other (paired up with each other). In FIG. 2, (a) is an example of the password retention table 101a.

The card unique ID is normally allocated to each memory card 200. However, for example, when the memory card 200 has a plurality of partitions, it is possible to set the card unique ID and the card password for each partition. Also in this case, it is possible to have one card unique ID and set a different card password for each partition. With this arrangement, it is possible to bring each partition into a locked state or an unlocked state. In addition, in the case of the virtual drive created in the file stored in the memory card 200, it is possible to bring each virtual drive into the locked state or the unlocked state.

In FIG. 2, (b) is another example of the password retention table 101b. The password retention table 101b is obtained by extending the password retention table 101a. In the password retention table 101b, the card unique ID and the card password of the card are stored in association with each other (paired up with each other) and, as other information, information on a card manufacturing maker indicative of a manufacturer of the memory card 200 and information on a card capacity indicative of the capacity of the memory card 200 are also stored. When the memory card 200 retains information facilitating discrimination of the memory card 200 such as other information described above, the password retention table 101b may be adapted to retain the information. By providing the password retention table 101b, it becomes possible for a user to easily decide which card password is set in which card. In addition, information such as a title and a note inputted by the user through the input unit 102 may be retained in the password retention table 101b.

Further, without storing the card unique ID in the password retention table 101a or 101b, only the card password and information other than the card unique ID may be stored.

The input unit 102 is a unit for inputting text, an image, and sound, and, there can be considered, e.g., an input key, a touch panel, a camera, a fingerprint sensor, a microphone, and the like as the input unit 102. The input unit 102 inputs the password or the like.

The power supply unit 103 supplies power to the memory card 200 via the memory card connection unit 108.

The card information acquisition unit 104 acquires card information such as the card unique ID and the like transmitted from the memory card 200 via the memory card connection unit 108, and stores the card information in the password retention unit 101 on an as needed basis. In addition, the card information acquisition unit 104 may acquire card manufacturer information, card capacity information, VerNo (Version Number) information, manufacture date information, and the like as the card information and store them in the password retention unit 101 on an as needed basis.

The setting cancellation unit 105 stores the card password inputted by the input unit 102 in the password retention unit 101 on an as needed basis. In addition, the setting cancellation unit 105 transmits a password setting signal for setting the card password to the memory card 200 via the memory card connection unit 108. The password setting signal includes the card password from the input unit 102 or the password retention unit 101 and a control signal.

Further, the setting cancellation unit 105 transmits an unlocking signal for unlocking the locked state of the memory card 200 to the memory card 200 via the memory card connection unit 108. The unlocking signal includes the card password from the password retention unit 101 or the input unit 102 and the control signal.

The lock state determination unit 106 determines whether or not the memory card 200 is in the locked state using the card password. For example, when the lock state determination unit 106 receives a locked state signal transmitted from the memory card 200 via the memory card connection unit 108, the lock state determination unit 106 determines that the memory card 200 is in the locked state.

In addition, the lock state determination unit 106 determines whether or not the card password is set in the memory card 200.

The data access unit 107 transmits an access signal for performing read processing and write processing with respect to data stored in the data storage unit 202 of the memory card 200 to the memory card 200 via the memory card connection unit 108 to perform the read and write of the data.

The memory card connection unit 108 is a unit for connecting the memory card 200, and is, e.g., a connection terminal. For example, the memory card 200 is inserted into a memory card slot and the memory card connection unit 108 and the electronic device connection unit 201 of the memory card 200 are connected to each other, whereby it becomes possible to perform a data exchange. In addition, the memory card connection unit 108 has a function for detecting the connection such as the insertion of the memory card 200 or the like.

The control unit 109 performs various controls of other components of the electronic device 100.

In addition, the control unit 109 transmits a password erasing signal for erasing the card password retained in the password retention unit 204 of the memory card 200 to the memory card 200 via the setting cancellation unit 105 and the memory card connection unit 108. The password erasing signal includes the card password of the memory card 200 from the input unit 102 or the password retention unit 101 and the control signal.

Further, the control unit 109 transmits a password update signal for updating the card password retained in the password retention unit 204 of the memory card 200 to the memory card 200 via the setting cancellation unit 105 and the memory card connection unit 108. The password update signal includes the card password of the memory card 200 and a new card password desired to be set at the time of the update from the input unit 102 or the password retention unit 101, and the control signal.

The display unit 110 performs the display of various data. For example, the display of card password information related to the card password, the display of various icons, and the like are performed. Details of the display will be described later. The card password information includes at least the information on the card password, and, in some cases, includes other card information such as the card unique ID information, the manufacturer information, the card capacity information, and the like. The display unit 110 is configured of, e.g., an LCD (Liquid Crystal Display), an organic EL (organic electroluminescence), an LED (light-emitting diode), the touch panel, and the like.

The device setting cancellation unit 111 performs the setting of a password of the main body of the electronic device 100 (hereinafter referred to as a device password), and locking and unlocking of functions of the main body of the electronic device 100 using the device password of the main body of the electronic device 100. A part of the functions of the electronic device 100 is normally locked and, when a user authentication is performed by verifying the input of the correct device password, the part of the functions is unlocked and made usable. It is to be noted that the device password is an example of a user authentication key of the electronic device 100 and, besides the device password, information for biometrics authentication using biometrics information such as a fingerprint, an iris, a voiceprint, and the like may also be used as the user authentication key of the electronic device 100. Since the user authentication key information is used for the purpose of authenticating the user of the electronic device, in the case of the biometrics information, even when the biometrics information does not completely match with the user authentication key information retained in the user authentication key retention part, the user is determined to be an authorized user and the match is considered to be synonymous with the user authentication key match in a case where the biometrics information matches with the user authentication key information to an extent that the user can be determined to be the authorized user. The biometrics information is also inputted by the input unit 102.

The device password retention unit 112 retains the device password for unlocking the main body of the electronic device 100.

The password display content selection unit 113 selects the content (display mode) displayed when the card password information is displayed using the input by the input unit 102 or the like. For example, the password display content selection unit 113 selects an all cards display mode which displays the card password information on all memory cards in addition to the card password information on the memory card currently connected to the electronic device 100, or a current card display mode which displays the card password information on only the memory card currently connected to the electronic device.

The electronic device connection unit 201 is a unit for the connection to the electronic device 100, and is, e.g., the connection terminal. For example, the memory card 200 is inserted into the memory card slot and the memory card connection unit 108 of the electronic device 100 and the electronic device connection unit 201 are connected to each other, whereby it becomes possible to perform the data exchange.

The data storage unit 202 stores various data.

The password determination unit 203 determines whether or not the card password included in the unlocking signal and the card password retained in the password retention unit 204 are identical with each other. In addition, when acquiring the password setting signal via the electronic device connection unit 201, the password determination unit 203 stores the card password included in the password setting signal in the password retention unit 204. In this case, the password determination unit 203 may transmit a signal indicating that the card password is set to the electronic device 100 via the electronic device connection unit 201.

In addition, when acquiring the password erasing signal via the electronic device connection unit 201, the password determination unit 203 searches the password retention unit 204 to erase the card password identical with the card password included in the password erasing signal. When performing the erasing of the card password, the password determination unit 203 may transmit a password erasing completion signal indicating that the erasing of the card password is completed to the electronic device 100 via the electronic device connection unit 201.

Further, when acquiring the password update signal via the electronic device connection unit 201, the password determination unit 203 searches the password retention unit 204 and, when the card password identical with the current password included in the password update signal is present, the password determination unit 203 updates the card password with the card password desired to be newly set which is included in the password update signal. When performing the update of the card password, the password determination unit 203 may transmit a password update completion signal indicating that the update of the card password is completed to the electronic device 100 via the electronic device connection unit 201.

The password retention unit 204 retains the card password of the memory card 200.

When power is supplied to the memory card 200, the lock unit 205 performs locking for prohibiting access to the data storage unit 202 to bring the memory card 200 into the locked state in a case where, e.g., the password is set in the password retention unit 204. In addition, when the password determination unit 203 determines that the password included in the unlocking signal acquired from the electronic device 100 is identical with the card password retained in the password retention unit 204, the lock unit 205 performs unlocking for unlocking the locked state.

Further, when performing the locking, the lock unit 205 transmits the locked state signal indicating that the memory card 200 is in the locked state to the electronic device 100 via the electronic device connection unit 201. On the other hand, when performing the unlocking, the lock unit 205 transmits an unlocking completion signal indicating that the unlocking is completed to the electronic device 100 via the electronic device connection unit 201. In addition, when the unlocking is unsuccessful, the lock unit 205 may be adapted to transmit an unlocking error signal indicating that the unlocking is unsuccessful to the electronic device 100 via the electronic device connection unit 201.

The card information transmission unit 206 transmits the card information such as the card unique ID or the like to the electronic device 100 via the electronic device connection unit 201.

Figure 3:
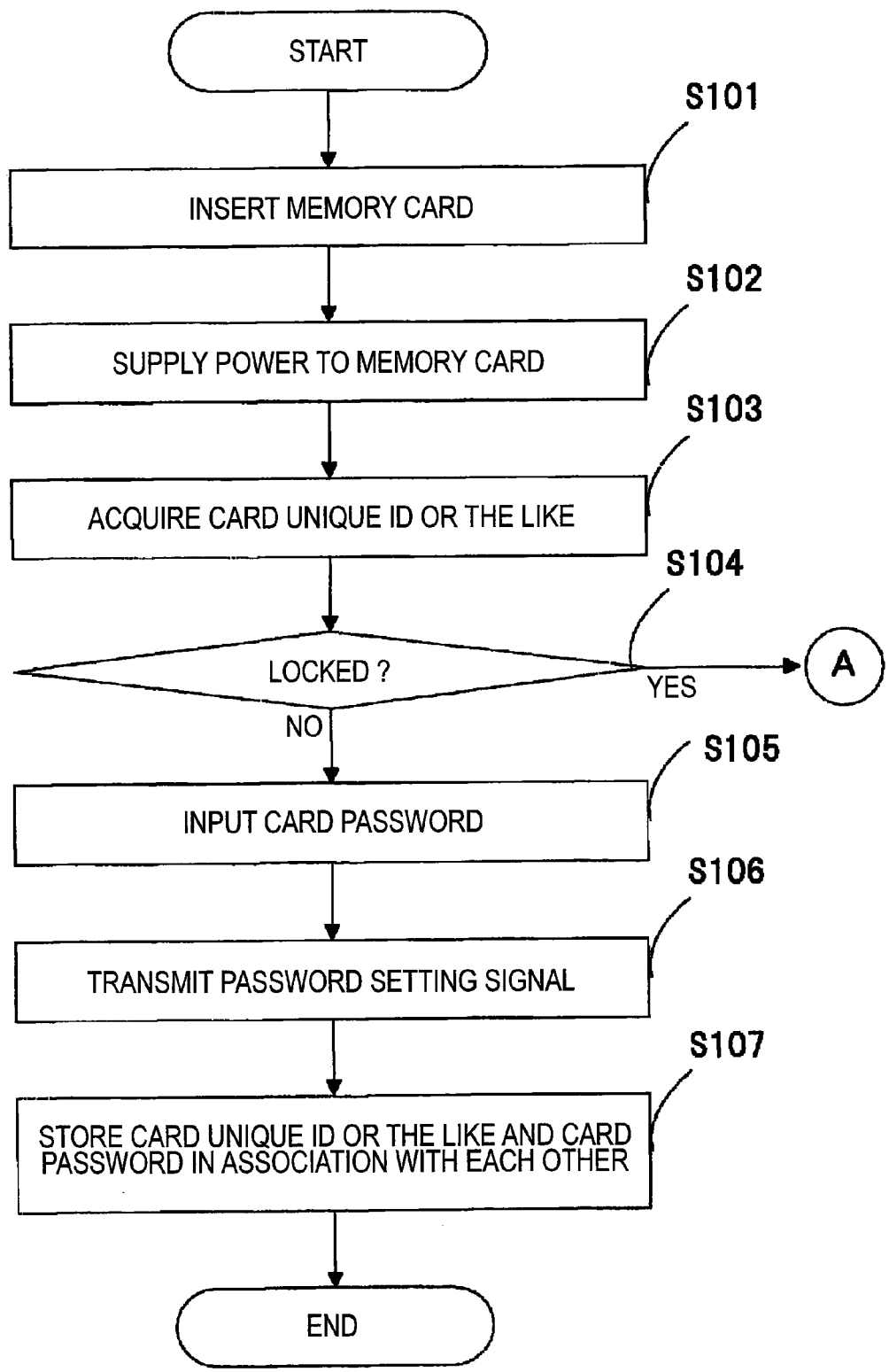
FIG. 3 is a flow chart showing an example of operations when the electronic device in the first embodiment of the present invention newly set a card password and when the electronic device unlocks a password lock of the memory card.
Figure 4:
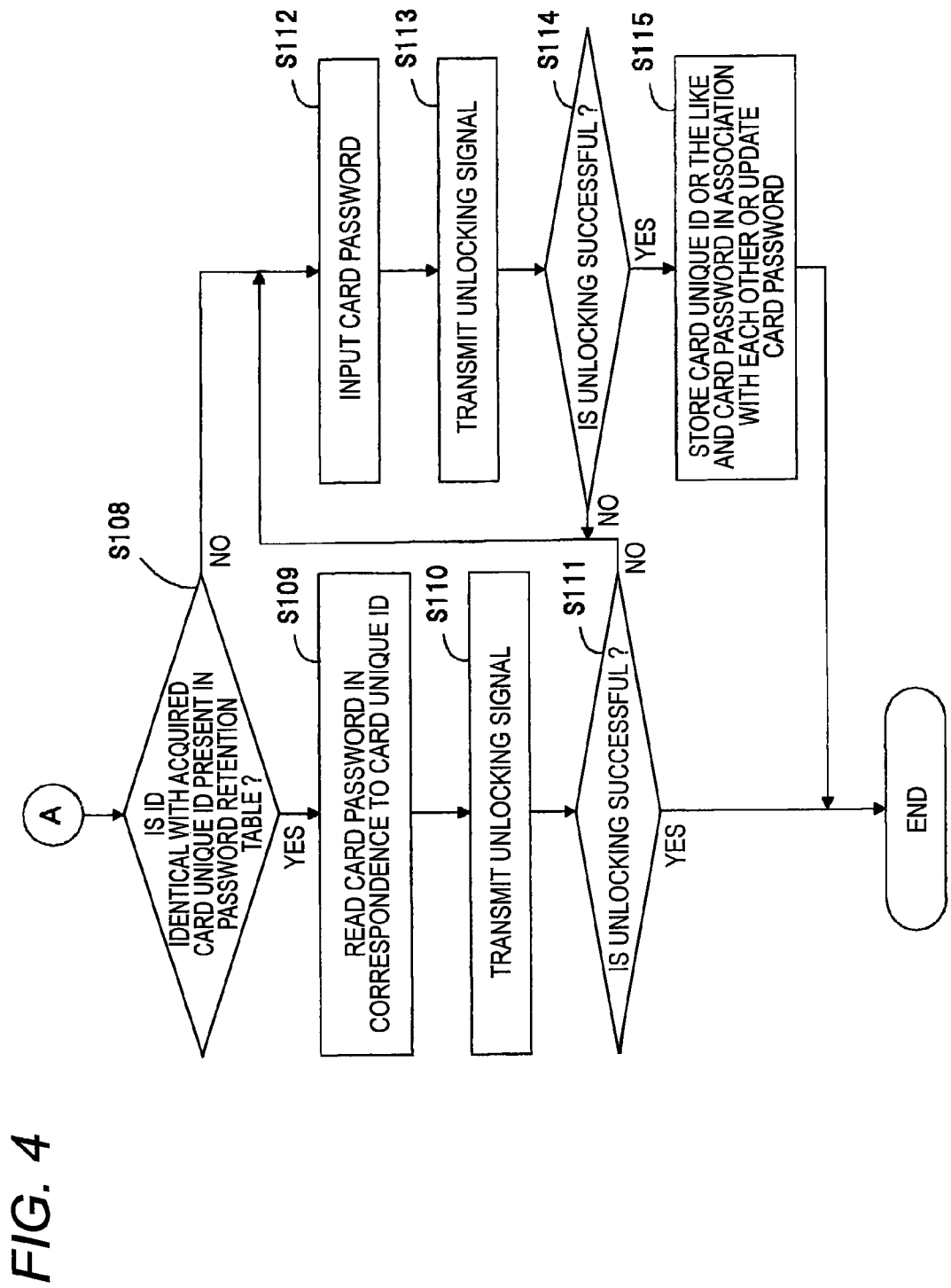
FIG. 4 is a flow chart showing an example of operations when the electronic device in the first embodiment of the present invention sets the card password and when the electronic device unlocks the password lock of the memory card.

Next, a description will be given of examples of operations when the electronic device 100 sets the card password and when the electronic device 100 unlocks the password lock of the memory card 200. FIGS. 3 and 4 are flow charts showing the examples of the operations when the electronic device 100 sets the card password and when the electronic device 100 unlocks the password lock of the memory card 200.

When the memory card connection unit 108 detects the connection such as the insertion of the memory card 200 into the memory card slot (step S101), the power supply unit 103 supplies power to the memory card 200 (step S102).

Subsequently, the card information acquisition unit 104 acquires the card unique ID or the like from the memory card 200 (step S103).

Then, the lock state determination unit 106 determines whether or not the memory card 200 is in the locked state (step S104). In this determination, for example, the lock state determination unit 106 acquires the locked state signal from the memory card 200 to determine whether or not the memory card 200 is in the locked state.

It is to be noted that the steps S103 and S104 are in no particular order.

When it is determined that the memory card 200 is not in the locked state, the electronic device 100 can perform read and write operations with respect to the data storage unit of the memory card 200. At this time, when the user selects the setting of a new password in the card ((a) in FIG. 11), the input unit 102 inputs the card password by the instruction of the user (step S105). At this time, for example, the display of (b) in FIG. 11 described later is performed by the display unit 110.

Subsequently, the setting cancellation unit 105 transmits the password setting signal in order to set the inputted card password in the memory card 200 (step S106).

Then, the setting cancellation unit 105 stores the acquired card unique ID or the like and the inputted card password in the password retention unit 101 in association with each other (step S107). At this time, for example, the display of (c) in FIG. 11 described later is performed by the display unit 110. This completes the setting of the card password.

In addition, in the step S104, when it is determined that the memory card 200 is in the locked state, the setting cancellation unit 105 refers to the password retention unit 101 to determine whether or not the card unique ID identical with the acquired card unique ID is present (step S108).

When the identical card unique ID is present, the setting cancellation unit 105 reads the card password recorded in association with (paired up with) the card unique ID from the password retention unit 101 (step S109). For example, in FIG. 2, when the card unique ID is "ID 1", the card password "PW 1" is read.

Subsequently, the setting cancellation unit 105 transmits the unlocking signal including the read card password (step S110).

Then, the lock state determination unit 106 determines whether or not the unlocking is successful (step S111). In this determination, for example, the unlocking may be determined to be successful when the unlocking completion signal is detected within a predetermined time period since the transmission of the unlocking signal, and the unlocking may be determined to be unsuccessful when the unlocking error signal is detected.

When the unlocking is successful, the unlocking processing is ended. When the unlocking is unsuccessful, the operational flow advances to the part of the flow immediately before the step S112.

When the identical card unique ID is not present in the step S108, or when the unlocking is unsuccessful in the step S111, the input unit 102 inputs the card password by the instruction of the user (step S112). At this time, for example, the display of (a) in FIG. 12 described later is performed by the display unit 110.

Subsequently, the setting cancellation unit 105 transmits the unlocking signal including the inputted card password (step S113).

Then, the lock state determination unit 106 determines whether or not the unlocking is successful (step S114). In this determination, for example, the unlocking may be determined to be successful when the unlocking completion signal is detected within the predetermined time period since the transmission of the unlocking signal, and the unlocking may be determined to be unsuccessful when the unlocking error signal is detected. When the unlocking is unsuccessful, the operational flow returns to the part of the flow immediately before the step S112.

When the unlocking is successful, the setting cancellation unit 105 stores the acquired card unique ID or the like and the inputted card password in the password retention unit 101 in association with each other (paired up with each other) (step S115). At this time, for example, the display of (b) in FIG. 12 described later is performed by the display unit 110. It is to be noted that, when the card password is already stored, the card password is updated with the inputted card password. This ends the processing of the unlocking and the card password setting.

When the locked state is unlocked, the data access unit 107 is capable of getting access to various data stored in the data storage unit 202 to perform the read processing, the write processing, and the like.

According to the electronic device 100 performing the processing of FIG. 3 and FIG. 4, it is possible to automatically unlock the lock using the card password. In addition, even when the memory card 200 is inserted and detached, the lock is unlocked without repeated input of the card password by the user so that convenience is improved. Further, with the operations described above, in the electronic device 100 performing the processing of FIGS. 3 and 4, the password information on the memory card 200 is stored in the password retention unit 101. Moreover, even in a case where the user selects the update/deletion of the password information set in the memory card 200, similarly to the processing described above, when the password update processing is successful, the electronic device 100 retains the new password information set in the memory card 200 in the password retention unit 101.

When an external storage device which does not retain the card unique ID such as the hard disk or the like is connected to the electronic device 100 instead of the memory card 200, there may be adopted, e.g., an operation in which the unlocking signal including the card password retained in the password retention table 101 is transmitted, the unlocking signal is generated by sequentially retrieving the card password in the table until the unlocking is successfully performed, and the unlocking signal is kept transmitted until the unlocking signal is received. With this operation, even when the external storage device which does not retain the card unique ID is connected to the electronic device 100, it is possible to automatically perform the unlocking.

Figure 5:
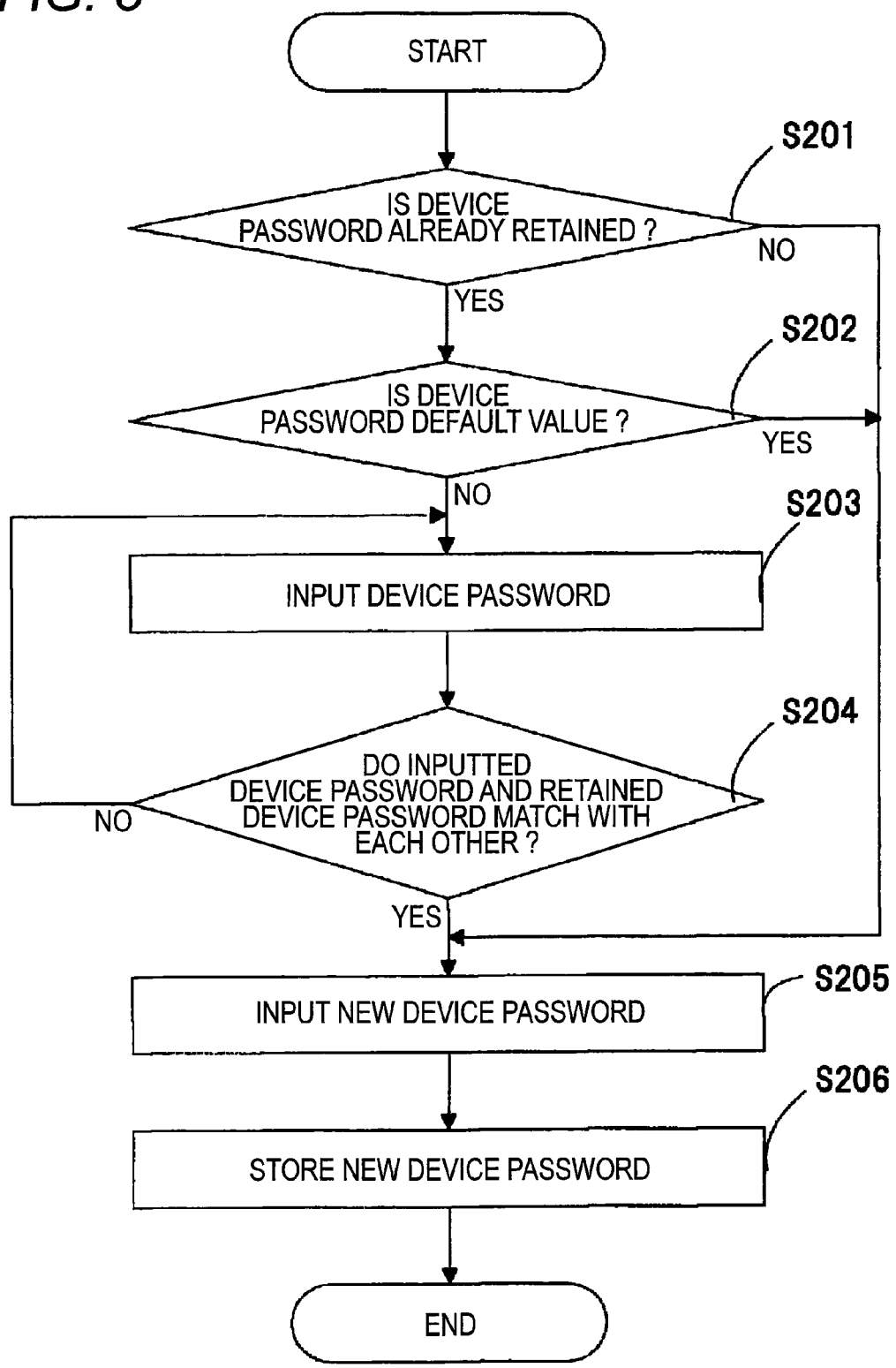
FIG. 5 is a flow chart showing an example of operations when a device password is set in the electronic device in the first embodiment of the present invention.

Next, a description will be given of an example of operations when the electronic device 100 sets the device password. FIG. 5 is a flow chart showing the example of the operations when the electronic device 100 sets the device password.

The setting of the device password is performed when a device password setting change menu is selected by the input unit 102. In addition, when the device password is not set or when a default value is set, by urging the user to perform the setting of the device password immediately after the processing of storing the card password information in the card password retention unit 101 (the processing of the step S107 or S115), it is possible to improve security at the time of the password display/output.

First, the device setting cancellation unit 111 determines whether or not the device password is retained in the device password retention unit 112 (step S201).

When the device password is retained, the device setting cancellation unit 111 determines whether or not the retained device password is the default value (step S202).

When the device password is not the default value, the input unit 102 inputs the device password by, e.g., the instruction of the user (step S203).

Subsequently, the device setting cancellation unit 111 determines whether or not the device password retained in the device password retention unit 112 and the device password inputted by the input unit 102 match with each other (step S204). When they do not match with each other, the operational flow returns to the part of the flow immediately before the step S203.

When it is determined that the device passwords match with each other in the step S204, when it is determined that the device password is not retained in the step S201, or when it is determined that the device password is the default value in the step S202, the input unit 102 inputs a new device password desired to be set by, e.g., the instruction of the user (step S205).

Then, the device setting cancellation unit 111 stores the inputted new device password (step S206). In this case, when the device password is not retained in the device password retention unit 112, the device password is newly stored. On the other hand, when the device password is retained in the device password retention unit 112, the device password is updated with the new device password.

According to the electronic device 100 performing the processing of FIG. 5, it becomes possible to set and update the device password.

Figure 6:
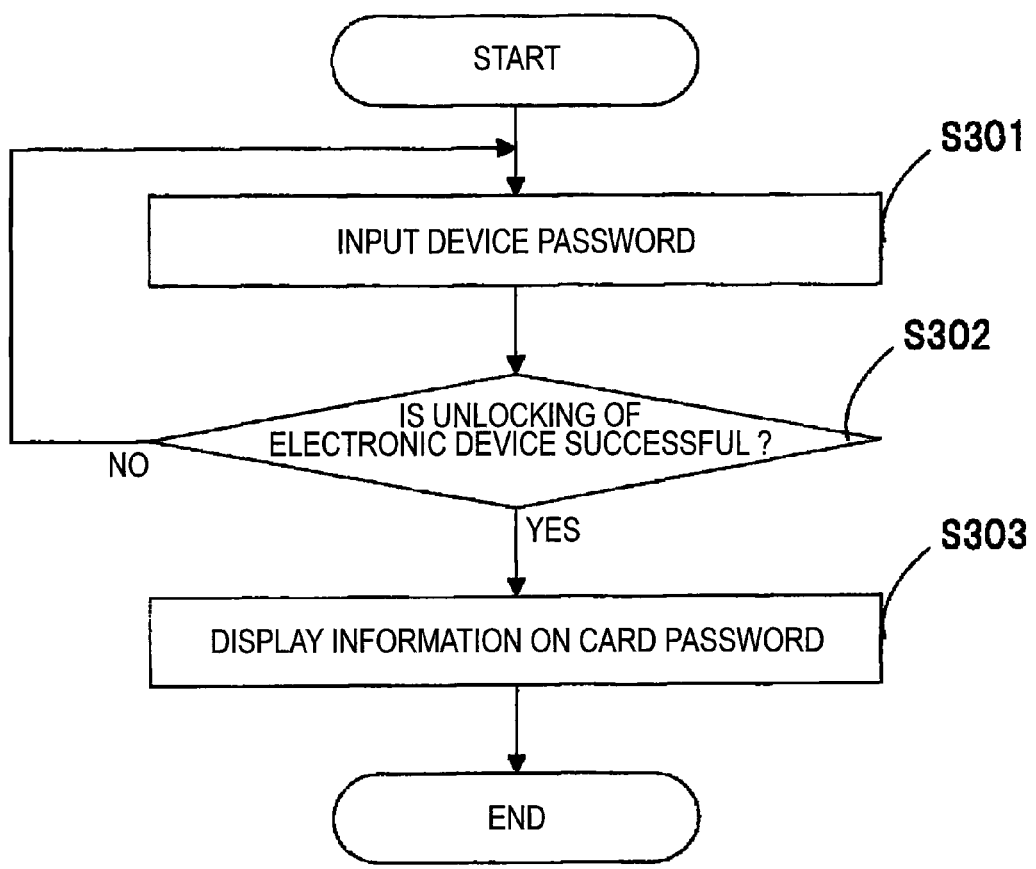
FIG. 6 is a flow chart showing an example of operations when the electronic device in the first embodiment of the present invention displays the card password in a case where a user forgets the card password.

Next, a description will be given of an example of operations when the electronic device 100 displays the card password in a case where the user forgets the card password. FIG. 6 is a flow chart showing the example of the operations when the electronic device 100 displays the card password. The display of the card password is performed e.g., when a card password display menu is selected by the input unit 102. As the card password display menu, for example, the display of (a) in FIG. 13 or (a) in FIG. 14 described later is performed by the display unit 110.

First, the input unit 101 inputs the device password by, e.g., the instruction of the user (step S301). In this case, for example, the display of (b) in FIG. 13 or (b) in FIG. 14 described later is performed by the display unit 110.

Subsequently, the device setting cancellation unit 111 determines whether or not the unlocking of the electronic device 100 is successful (step S302). In this case, the device setting unit 111 compares the inputted device password with the device password retained in the device password retention unit 112. When the two device passwords are identical with each other, the lock using the device password is unlocked.

When it is determined that the unlocking of the electronic device 100 is unsuccessful, the operational flow returns to the part of the flow immediately before the step S301.

When it is determined that the unlocking of the electronic device 100 is successful, the control unit 109 reads the card password information from the password retention unit 101 to display the card password information in the display unit 110 (step S303). In addition, together with the card password information, the card unique ID in correspondence to the card password may be displayed as necessary. In this case, for example, the display such as (c) in FIG. 13 or (c) in FIG. 14 described later is performed by the display unit 110.

According to the electronic device 100 performing the processing of FIG. 6, when the unlocking of the lock of the main body of the electronic device 100 using the device password is successful, since it becomes possible to ascertain the card password information retained in the password retention unit, it becomes possible to unlock the password lock of the memory card 200 even in a case where the card password is forgotten.

Figure 9:
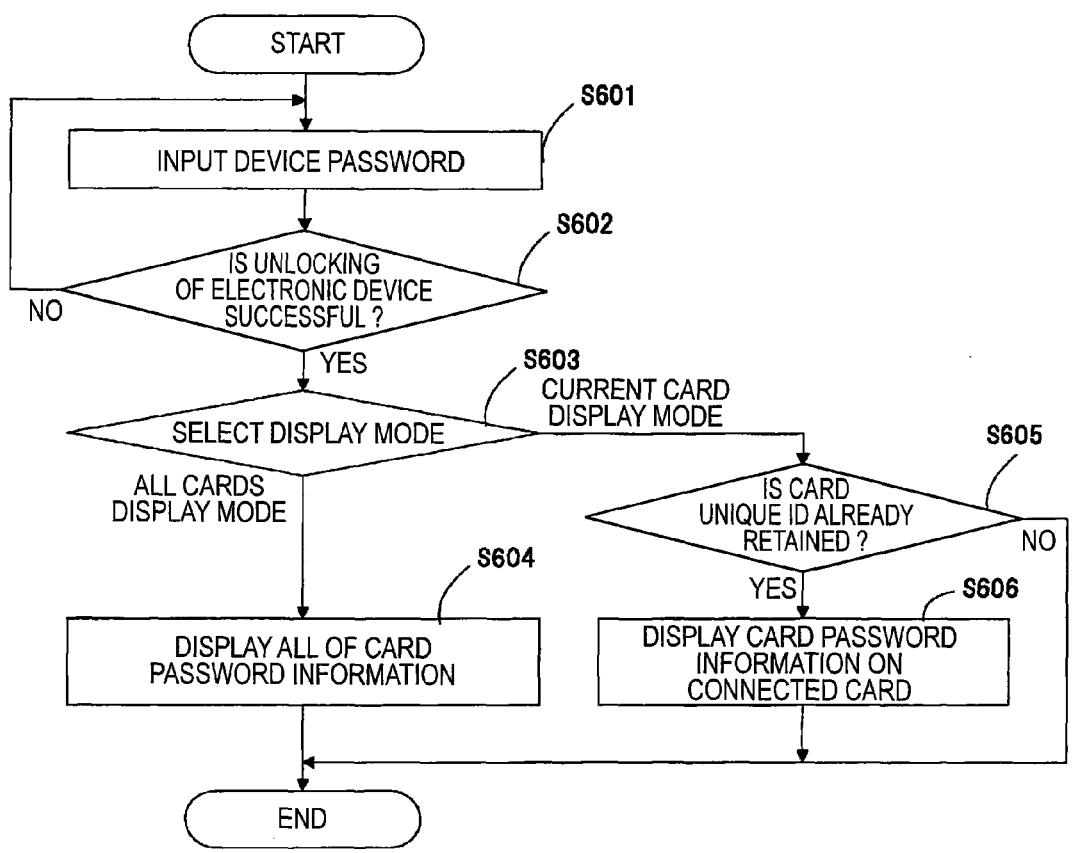
FIG. 9 is a flow chart showing an example of operations when the electronic device 100 in the first embodiment of the present invention selects a display mode.

Next, a description will be given of an example of operations when the electronic device 100 displays the card password information in a case where the user forgets the card password. FIG. 9 shows an example of operations when the electronic device 100 selects the display mode. The selection of the display mode is performed, e.g., when the card password display menu is selected by the input unit 102. As the card password display menu, for example, the display of (a) in FIG. 15 described later is performed by the display unit 110.

First, the input unit 101 inputs the device password by, e.g., the instruction of the user (step S601). At this time, for example, the display of (b) in FIG. 15 described later is performed by the display unit 110.

Subsequently, the device setting cancellation unit 111 determines whether or not the unlocking of the electronic device 100 is successful (step S602). In this case, the device setting unit 111 compares the inputted device password with the device password retained in the device password retention unit 112. When the two device passwords are identical with each other, the lock using the device password is unlocked.

When it is determined that the unlocking of the electronic device 100 is unsuccessful, the operational flow returns to the part of the flow immediately before the step S601.

When it is determined that the unlocking of the electronic device 100 is successful, the password display content selection unit 113 selects the display mode (step S603). For example, as the display mode, the password display content selection unit 113 selects the all cards display mode or the current card display mode. In this case, for example, the display of (c) in FIG. 15 described later is performed by the display unit 110.

When the all cards display mode is selected, the control unit 109 reads all of the card password information retained in the password retention unit 101 and displays them in the display unit 110 (step S604). For example, even when the card unique ID of the memory card 200 currently connected to the electronic device 100 is ID 1, the control unit 109 also displays the card password information related to other card unique IDs (ID 2 . . . ID n). In addition, when the password retention unit 101 has the password retention table 101a, the information shown in (a) of FIG. 2 is displayed and, when the password retention unit 101 has the password retention table 101b, the information shown in (b) of FIG. 2 is displayed.

On the other hand, when the current card display mode is selected, the control unit 109 determines whether or not the card unique ID acquired from the card information acquisition unit 104 is retained in the password retention unit 101 (step S605).

When the card unique ID is retained in the password retention unit 101, only the card password information in correspondence to the acquired card unique ID retained in the password retention unit 101 is read and displayed in the display unit 110 (step S606). For example, when the card unique ID of the memory card 200 currently connected to the electronic device 100 is ID 2, only the card password information PW 2 related to ID 2 is displayed. In this case, for example, the display of (d) in FIG. 15 described later is performed by the display unit 110. In addition, for example, when the password retention unit 101 has the password retention table 101a, the information shown in (a) of FIG. 2 is displayed and, when the password retention unit 101 has the password retention table 101b, the information shown in (b) of FIG. 2 is displayed. It is to be noted that an operation may be adopted in which it is ascertained whether or not the memory card 200 can actually be unlocked using PW 2 and the display is performed only when the memory card 200 can be unlocked.

When the card unique ID is not retained in the password retention unit 101, the electronic device 100 does not display the card password information and ends the processing of FIG. 9.

According to the electronic device 100 performing the processing of FIG. 9, by selecting the display mode, it becomes possible to change the display method of the card password information in accordance with the intention of the user. When the all cards display mode is selected, it becomes possible to display all of the information retained in the password retention unit 101 and, since the user can easily ascertain the card password information on every memory card 200, it becomes possible to unlock the password lock of the memory card 200 even when the user forgets the card password. In addition, when the current card display mode is selected, it is possible to ascertain only the card password information on the currently connected memory card 200 and, since only the required information can be immediately ascertained, it becomes possible to unlock the password lock of the memory card 200 even when the user forgets the card password.

Figure 7:
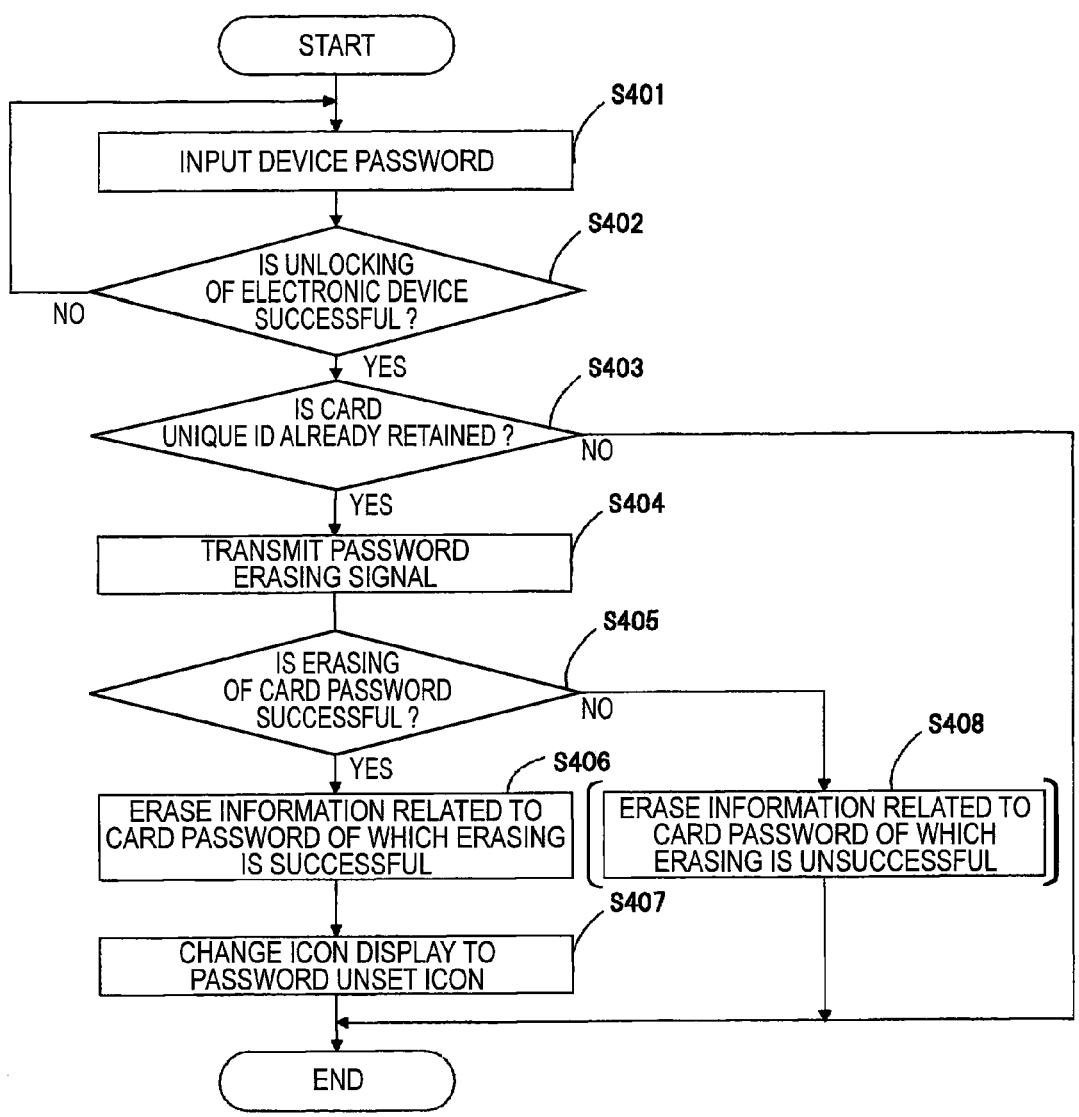
FIG. 7 is a flow chart showing an example of operations when the electronic device in the first embodiment of the present invention erases the card password set in the memory card in the case where the user forgets the card password.

Next, a description will be given of an example of operations when the electronic device 100 erases the card password set in the memory card 200 when the user forgets the card password. FIG. 7 is a flow chart showing the example of the operations when the electronic device 100 erases the card password set in the memory card 200. The erasing of the card password is performed, e.g., when a card password erasing menu is selected by the input unit 102. As the card password erasing menu, for example, the display of (a) in FIG. 16 described later is performed by the display unit 110.

First, the input unit 101 inputs the device password by, e.g., the instruction of the user (step S401). At this time, for example, the display of (b) in FIG. 16 described later is performed by the display unit 110.

Subsequently, the device setting cancellation unit 111 determines whether or not the unlocking of the electronic device 100 is successful (step S402). In this case, the device setting unit 111 compares the inputted device password with the device password retained in the device password retention unit 112. When the two device passwords are identical with each other, the lock by the device password is unlocked.

When it is determined that the unlocking of the electronic device 100 is unsuccessful, the operational flow returns to the part of the flow immediately before the step S401.

When it is determined that the unlocking of the electronic device 100 is successful, the control unit 109 determines whether or not the card unique ID acquired from the card information acquisition unit 104 is retained in the password retention unit 101 (step S403).

When the acquired card unique ID is already retained in the password retention unit 101, the control unit 109 transmits the password erasing signal described above to the memory card 200 (step S404). The password erasing signal includes the card password of the memory card 200 stored in the password retention unit 101 and the control signal.

Subsequently, the control unit 109 determines whether or not the erasing of the card password retained in the password retention unit 204 of the memory card 200 is successful (step S405).

When the erasing of the card password is successful, the control unit 109 erases a series of information in correspondence to the erased card password from the password retention unit 101 (step S406). For example, in the password retention tables 101a and 101b, a row where the card password exists is deleted.

Then, the control unit 110 changes an icon display by the display unit 110 to a password unset icon described later (step S407). In this case, for example, the display of (c) in FIG. 16 described later is performed by the display unit 110.

When the card unique ID is not retained in the password retention unit 101 in the step S403, and when the erasing of the card password is unsuccessful in the step S405, the electronic device 100 fails in the erasing of the card password and ends the processing of FIG. 7. It is to be noted that, when the erasing of the card password is unsuccessful in the step S405, the control unit 109 may erase a series of information in correspondence to the card password of which the erasing is unsuccessful from the password retention unit 101 (step S408).

According to the electronic device 100 performing the processing of FIG. 7, when the unlocking of the lock of the main body of the electronic device 100 using the device password is successful, since it is possible to delete the card password information to bring the memory card 200 into the state where the password is not set, it becomes possible to use the memory card 200 even when the card password is forgotten.

Figure 8:
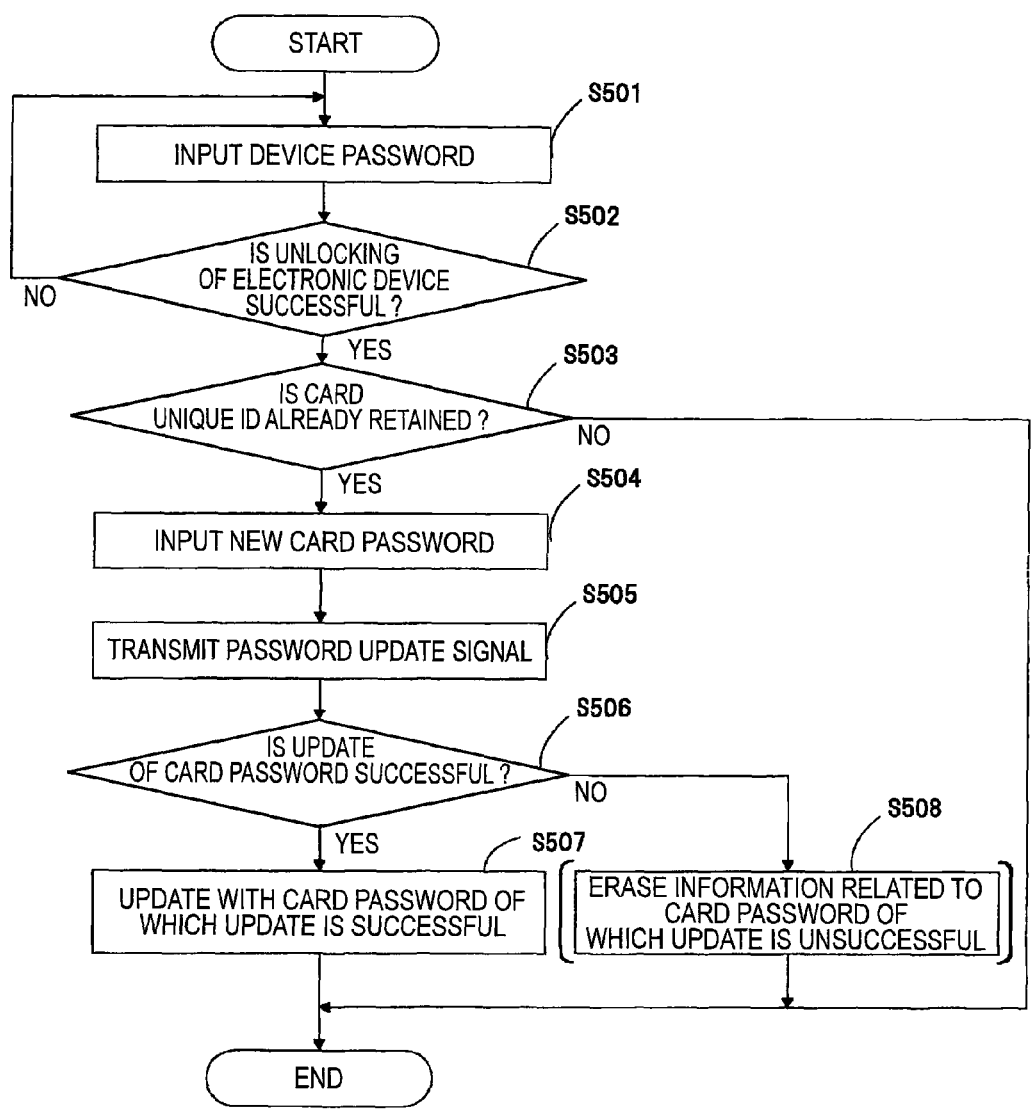
FIG. 8 is a flow chart showing an example of operations when the electronic device in the first embodiment of the present invention updates the card password set in the memory card in the case where the user forgets the card password.

Next, a description will be given of an example of operations when the electronic device 100 updates the card password set in the memory card 200 in a case where the user forgets the card password. FIG. 8 is a flow chart showing the example of the operations when the electronic device 100 updates the card password set in the memory card 200. The update of the card password is performed, e.g., when a card password update menu is selected by the input unit 102. As the card password update menu, for example, the display of (a) in FIG. 17 described later is performed by the display unit 110.

First, the input unit 101 inputs the device password by, e.g., the instruction of the user (step S501). In this case, for example, the display of (b) in FIG. 17 described later is performed by the display unit 110.

Subsequently, the device setting cancellation unit 111 determines whether or not the unlocking of the electronic device 100 is successful (step S502). In this case, the device setting unit 111 compares the inputted device password with the device password retained in the device password retention unit 112. When the two device passwords are identical with each other, the lock by the device password is unlocked.

When it is determined that the unlocking of the electronic device 100 is unsuccessful, the operational flow returns to the part of the flow immediately before the step S501.

When it is determined that the unlocking of the electronic device 100 is successful, the control unit 109 determines whether or not the card unique ID acquired from the card information acquisition unit 104 is retained in the password retention unit 101 (step S503).

When the acquired card unique ID is already retained in the password retention unit 101, the input unit 102 inputs a new card password desired to be set at the time of the update by, e.g., the instruction of the user (step S504). At this time, for example, the display of (c) in FIG. 17 described later is performed by the display unit 110.

Subsequently, the control unit 109 transmits the password update signal described above to the memory card 200 (step S505). The password update signal includes the card password of the memory card 200 retained in the password retention unit 101 and the control signal.

Then, the control unit 109 determines whether or not the update of the card password retained by the password retention unit 204 of the memory card 200 is successful (step S506).

When the update of the card password is successful, the control unit 109 updates the password retention unit 101 with the updated card password (step S507). In this case, for example, the display of (d) in FIG. 17 described later is performed by the display unit 110. It is to be noted that, simultaneously with the update of the password, the unlocking processing may be performed or does not need to be performed.

When the card unique ID is not retained in the password retention unit 101 in the step S503, and when the update of the card password is unsuccessful in the step S506, the electronic device 100 fails in the update of the card password and ends the processing of FIG. 8. It is to be noted that, when the erasing of the card password is unsuccessful in the step S506, the control unit 109 may erase a series of information in correspondence to the card password of which the update is unsuccessful from the password retention unit 101 (step S508).

According to the electronic device 100 performing the processing of FIG. 8, when the unlocking of the lock of the main body of the electronic device 100 using the device password is successful, since the card password information can be changed, the user can set the card password of the memory card 200 once again even in a case where the card password is forgotten so that it becomes possible to use the memory card 200 with high safety even after the card password is forgotten.

It is to be noted that, although the execution of update of the card password has been described herein, it is also possible to newly set the card password after the card password is temporarily erased.

Next, a detailed description will be given of the display by the display unit 110.

Figure 10:
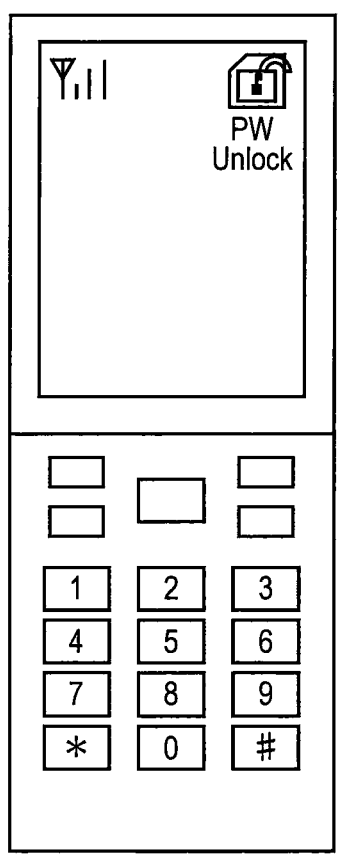
FIG. 10 shows an example of the electronic device in the first embodiment of the present invention performing an icon display and examples of icons displayed by a display part of the electronic device.

The display unit 110 performs the display of the card password information, the display of various icons, and the like by the instruction of the control unit 109. As the icons, there are a lock icon indicating that the card password is already set and the memory card 200 is locked, an unlock icon indicating that the card password is already set and the memory card 200 is unlocked, and the password unset icon indicating that the card password of the memory card 200 is not set. In FIG. 10, (a) shows an example of the electronic device 100 performing the icon display, while (b) shows examples of the icons displayed by the display unit 110.

It is possible to recognize that the card password is already set in the memory card 200 from, e.g., the operation that the memory card 200 is automatically brought into the locked state after the power supply to the memory card 200. For example, in the case of "Yes" in the step S104 of FIG. 3, the password is already set and the memory card 200 is locked.

It is possible to recognize that the card password is not set in the memory card 200 from, e.g., the operation that the memory card 200 is not automatically brought into the locked state after the power supply to the memory card 200. For example, in the case of "No" in the step S104 of FIG. 3, the password is not set.

When the card password is already set in the memory card 200, for example, the memory card 200 is automatically brought into the locked state after the power supply to the memory card 200, and is brought into the unlocked state with success in the unlocking using the unlocking signal performed afterward. For example, in the case of "Yes" in the step S111 of FIG. 3, the password is already set and the memory card 200 is unlocked.

Next, a description will be given of examples of the display by the display unit 110.

Figure 11:
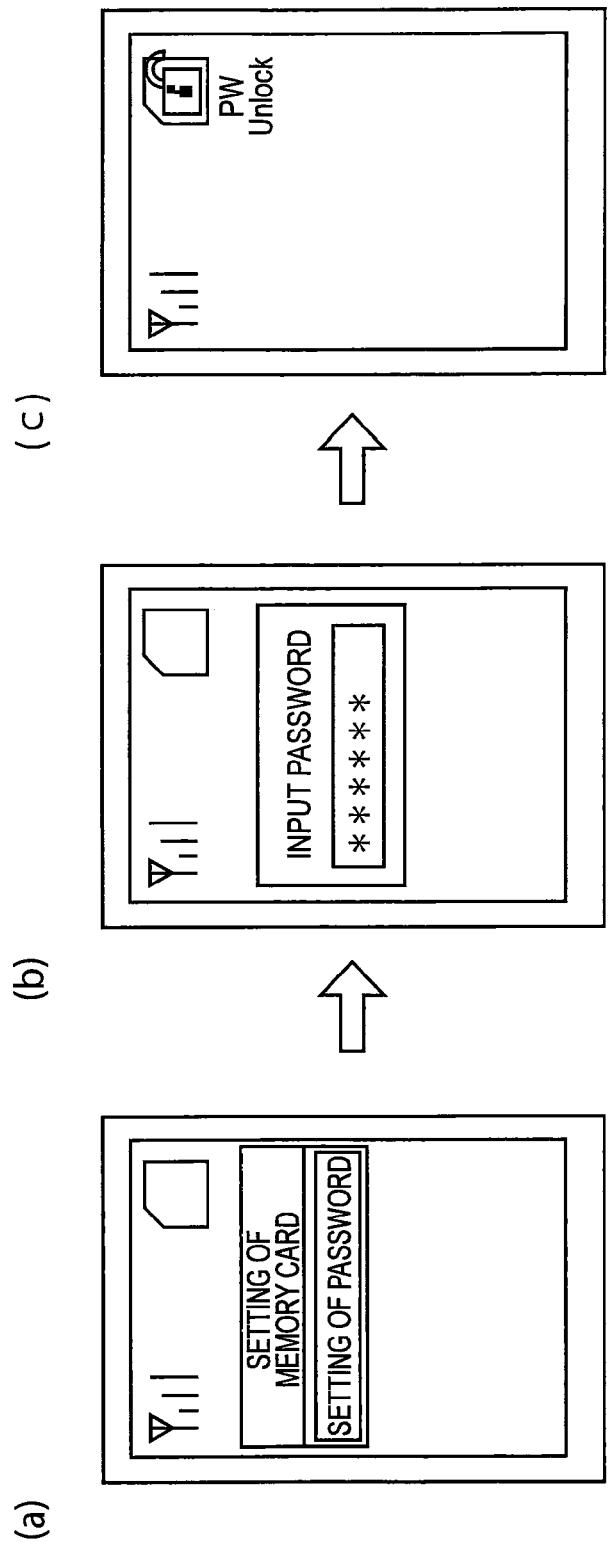
FIG. 11 shows examples of screen displays by the display part of the electronic device in the first embodiment of the present invention.

FIG. 11 shows examples of the screen displays when the card password is set in the memory card 200 in a case where the memory card 200 in which the card password is not set is connected.

When the electronic device 100 needs the input of the card password by the input unit 102, first, as shown in (a) of FIG.

11, the display unit 110 displays a setting screen of the card password. In this screen, the password unset icon is displayed.

Subsequently, as shown in (b) of FIG. 11, the display unit 110 displays an input screen of the card password. In this screen, the password unset icon is continuously displayed.

Then, as shown (c) of FIG. 11, the display unit 110 displays an unlocking screen after the input of the card password. In this screen, the unlock icon is displayed.

With the screen displays of FIG. 11, it is possible for the user to instantly ascertain that the memory card 200 is brought into the unlocked state after the card password is set from the state where the card password of the memory card 200 is not set.

Figure 12:
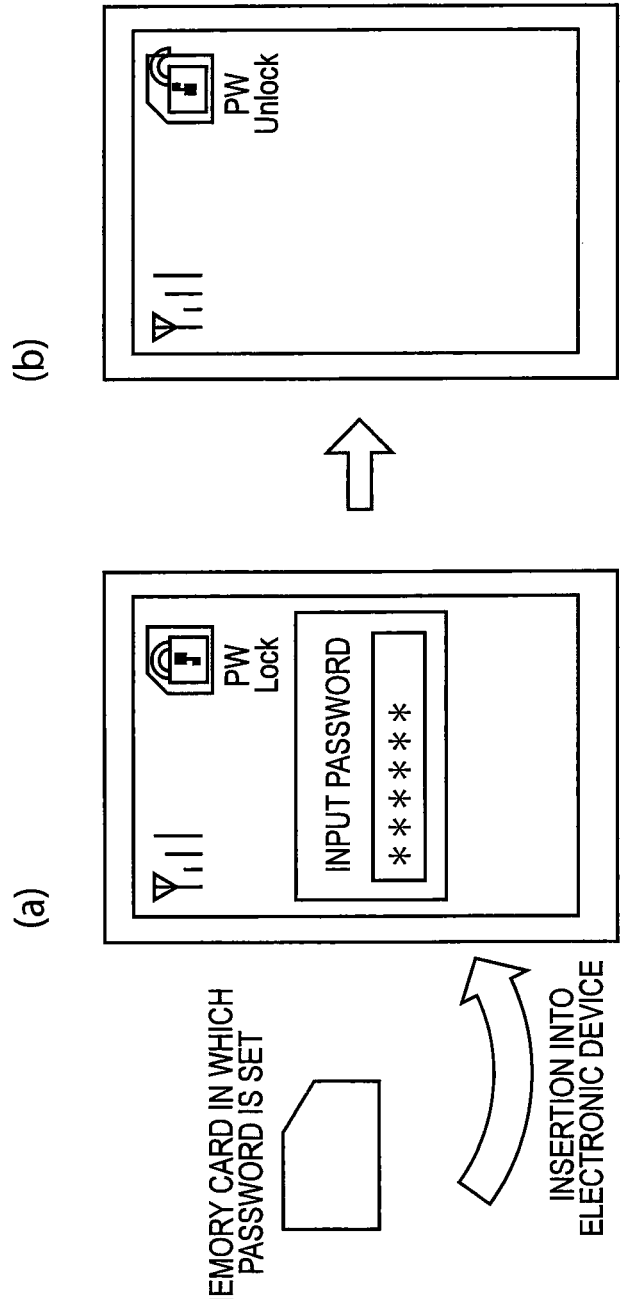
FIG. 12 shows examples of screen displays by the display part of the electronic device in the first embodiment of the present invention.

FIG. 12 shows examples of screen displays when the memory card 200 having the card password set therein is connected and the unlocking of the memory card 200 is successfully performed through the input of the card password.

For example, in a case where the card password is already set and the card password information on the memory card 200 is not retained in the password retention unit 101, when the memory card 200 having the card password set therein is inserted into the electronic device 100, as shown in (a) of FIG. 12, the display unit 110 displays the input screen of the card password. In this screen, the lock icon is displayed.

Subsequently, when the input of the card password is performed by the input unit 102, the electronic device 100 transmits the unlocking signal to the memory card 200. When the unlocking is successful, as shown in (b) of FIG. 12, the display unit 110 displays the unlocking screen. In this screen, the unlock icon is displayed. In addition, in this case, the card unique ID of the inserted memory card 200 and the card password information thereon are stored in the password retention unit 101.

With the screen displays of FIG. 12, it is possible for the user to instantly ascertain that the memory card 200 is not in the state where the password is not set, but in the state where the password is set, and the memory card 200 is brought into the unlocked state after password authentication.

Figure 13:
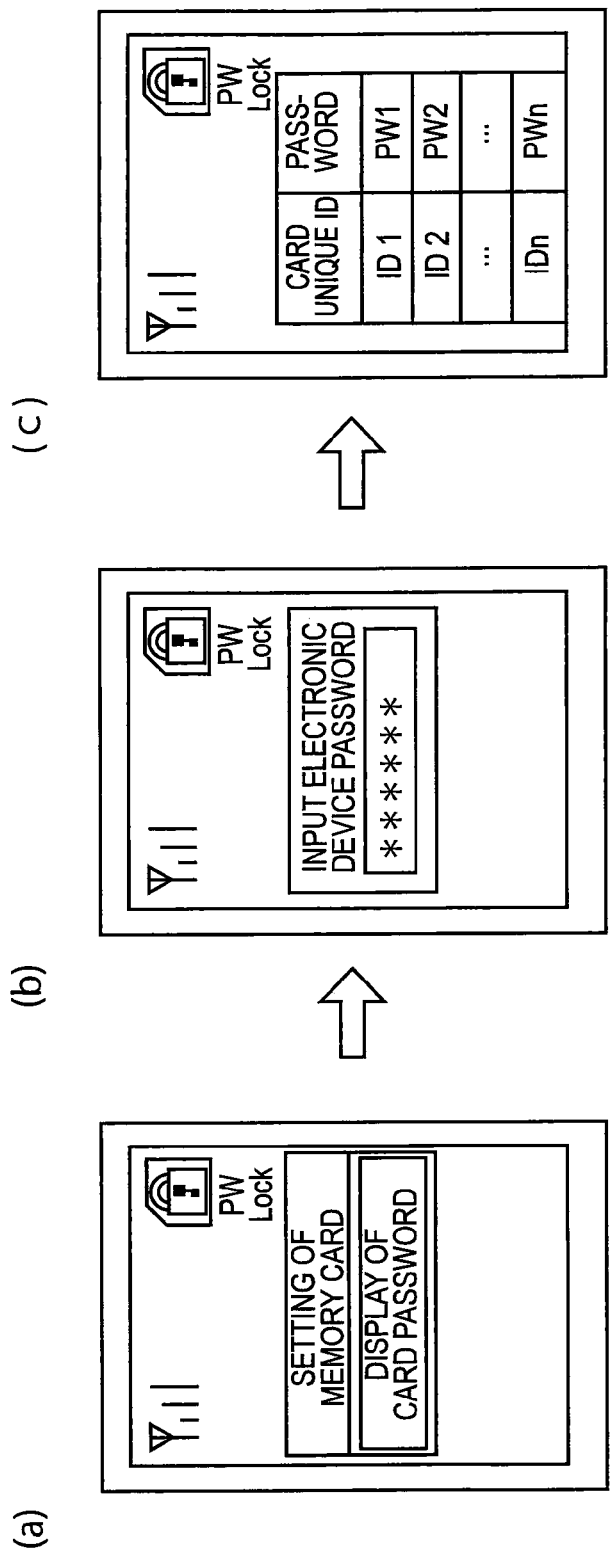
FIG. 13 shows examples of screen displays by the display part of the electronic device in the first embodiment of the present invention.

FIG. 13 shows examples of screen displays at the time of selection of the card password display menu to be selected when the user forgets the card password. FIG. 13 shows examples of the display when the password retention unit 101 has the password retention table 101a and the password display content selection unit 113 selects the all cards display mode.

With regard to a case where the electronic device 100 carries out the display of the card password, for example, when the user selects the card password display menu displayed in the display unit 110 as shown in (a) in FIG. 13 through the input unit 102, the display of the card password is carried out. In this screen, the lock icon is displayed.

Subsequently, as shown in (b) in FIG. 13, the display unit 110 displays the input screen of the device password. In this screen, the lock icon is continuously displayed.

When the inputted device password and the device password retained in the device password retention unit 112 match with each other, as shown in (c) in FIG. 13, the display unit 110 displays the information in the password retention table 101a. In this screen, the lock icon is continuously displayed. It is to be noted that the card unique ID does not need to be displayed in the display unit 110 or retained in the password retention unit 101.

With the screen displays of FIG. 13, even when the card password of the memory card 200 is forgotten, it is possible to safely acquire the card password information.

Figure 14:
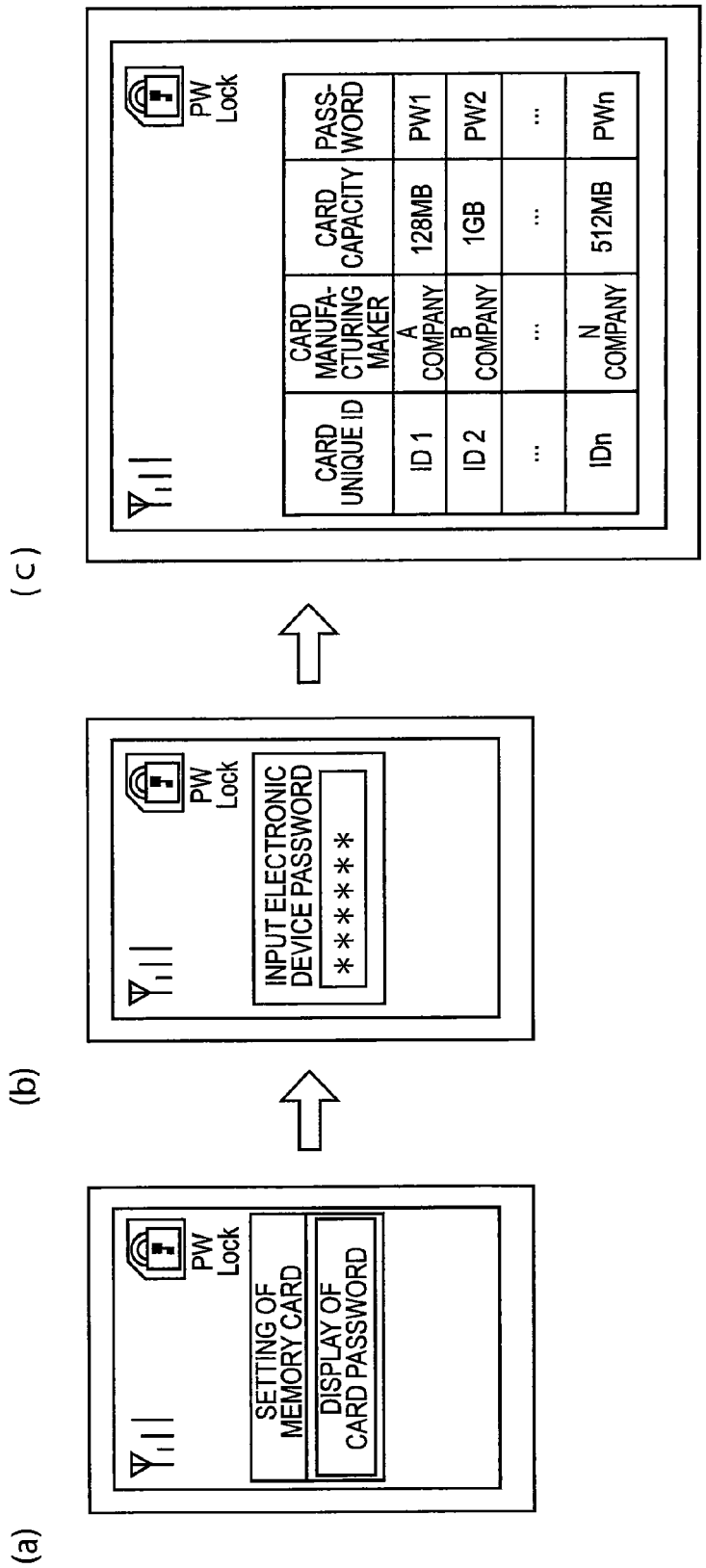
FIG. 14 shows examples of screen displays by the display part of the electronic device in the first embodiment of the present invention.

FIG. 14 shows examples of other screen displays at the time of selection of the card password display menu to be selected when the user forgets the card password. FIG. 14 shows examples of the display when the password retention unit 101 has the password retention table 101b and the password display content selection unit 113 selects the all cards display mode.

With regard to a case where the electronic device 100 carries out the display of the card password, for example, when the user selects the card password display menu displayed in the display unit 110 as shown in (a) in FIG. 14 through the input unit 102, the display of the card password is carried out. In this screen, the lock icon is displayed.

Subsequently, as shown in (b) in FIG. 14, the display unit 110 displays the input screen of the device password. In this screen, the lock icon is continuously displayed.

When the inputted device password and the device password retained in the device password retention unit 112 match with each other, as shown in (c) in FIG. 14, the display unit 110 displays the information in the password retention table 101b. In this screen, the lock icon is continuously displayed. It is to be noted that the card unique ID does not need to be displayed in the display unit 110 or retained in the password retention unit 101.

With the screen displays of FIG. 14, even when the card password of the memory card 200 is forgotten, it is possible to safely acquire the card password information on the basis of a larger amount of information. It is to be noted that, though not shown in FIG. 14, the information such as a title or a note inputted by the user and stored in the password retention table 101b may also be displayed.

Figure 15:
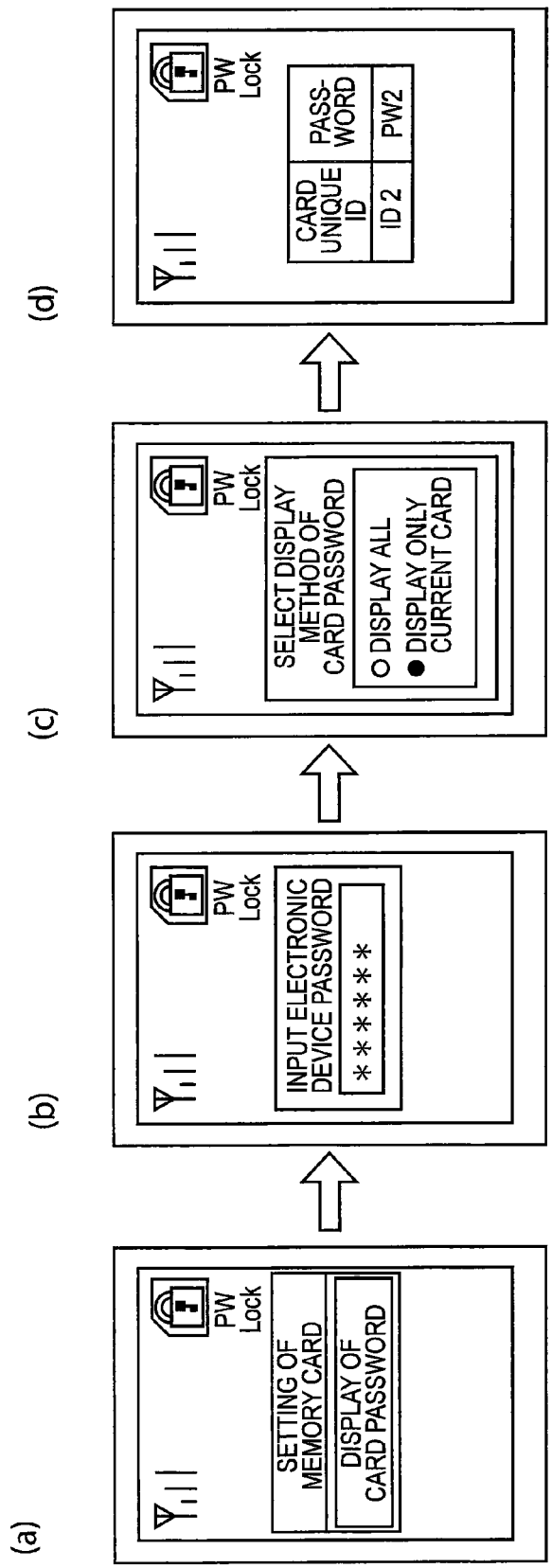
FIG. 15 shows examples of screen displays by the display part of the electronic device in the first embodiment of the present invention.

FIG. 15 shows examples of other screen displays at the time of selection of the card password display menu to be selected when the user forgets the card password. FIG. 15 shows examples of the display when the password retention unit 101 has the password retention table 101a and the password display content selection unit 113 selects the current card display mode.

With regard to a case where the electronic device 100 carries out the display of the card password, for example, when the user selects the card password display menu displayed in the display unit 110 as shown in (a) in FIG. 15 through the input unit 102, the display of the card password is carried out. In this screen, the lock icon is displayed.

Subsequently, as shown in (b) in FIG. 15, the display unit 110 displays the input screen of the device password. In this screen, the lock icon is continuously displayed.

When the inputted device password and the device password retained in the device password retention unit 112 match with each other, as shown in (c) in FIG. 15, the display unit 110 displays a selection screen for selecting the display content of the card password. For example, the display screen 110 displays "display all" indicative of the all cards display mode and "display only current card" indicative of the current card display mode. In this screen, the lock icon is continuously displayed.

When the current card display mode is selected, as shown in (d) in FIG. 15, the display unit 110 displays the information on the inserted memory card 200 in the password retention table 101a (or the password retention table 101b). In this screen, the lock icon is continuously displayed. It is to be noted that the card unique ID does not need to be displayed in the display unit 110.

With the screen displays of FIG. 15, even when the card password of the memory card 200 is forgotten, it is possible to safely acquire the card password information on the inserted memory card 200 so that it becomes possible for the user to easily understand the card password information.

It is to be noted that the display unit 110 may be adapted to display the selection screen for selecting the display content of the card password of (c) in FIG. 15 between (b) and (c) in FIG. 13, or between (b) and (c) in FIG. 14. FIG. 13 and FIG. 14 show the examples of the displays when the all cards display mode is selected.

Figure 16:
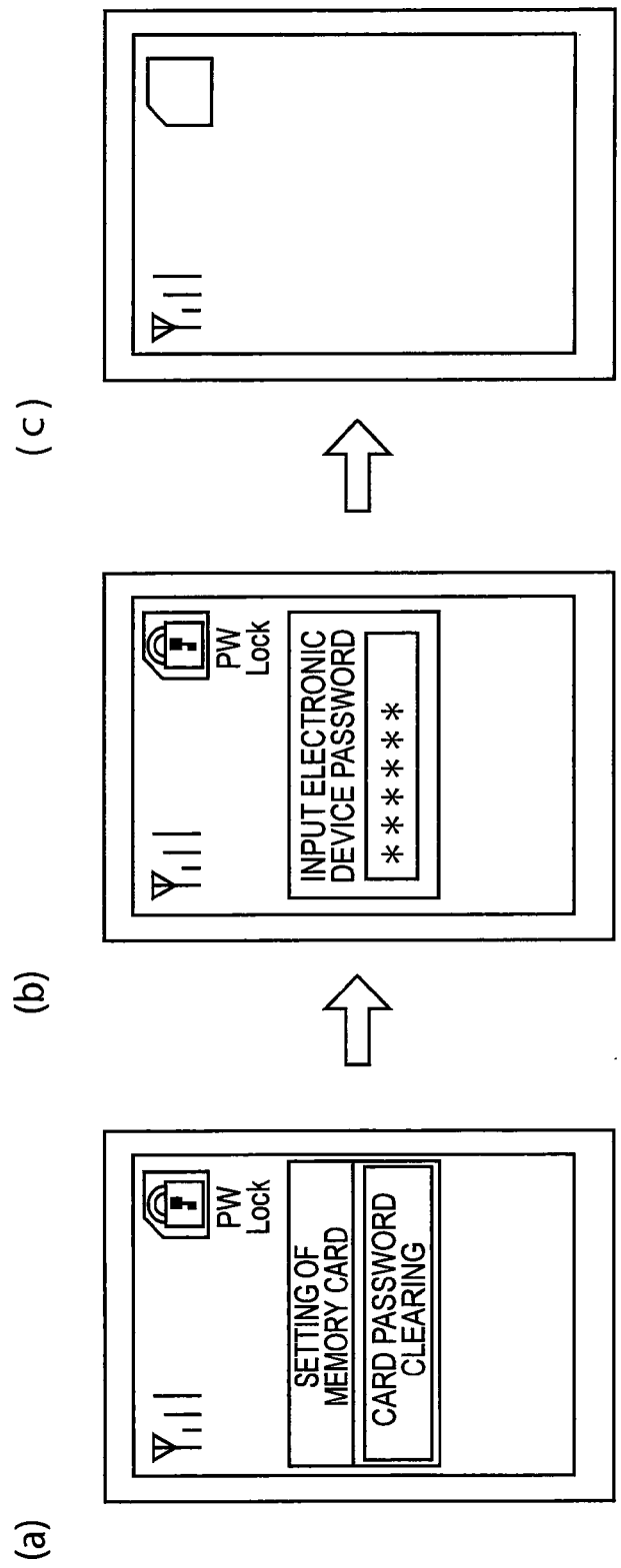
FIG. 16 shows examples of screen displays by the display part of the electronic device in the first embodiment of the present invention.

FIG. 16 shows examples of screen displays at the time of selection of a card password clearing (deletion) menu to be selected when the user forgets the card password.

With regard to a case where the electronic device 100 carries out clearing of the card password, for example, when the user selects the card password clearing menu displayed in the display unit 110 as shown in (a) in FIG. 16 through the input unit 102, the clearing of the card password is carried out. In this screen, the lock icon is displayed.

Subsequently, as shown in (b) in FIG. 16, the display unit 110 displays the input screen of the device password. In this screen, the lock icon is continuously displayed.

When the inputted device password and the device password retained in the device password retention unit 112 match with each other, the control unit 109 transmits the password erasing signal described above to the memory card 200 to clear the card password set in the memory card 200 and, as shown in (c) of FIG. 16, the display unit 110 displays a screen denoting that the card password set in the memory card 200 is cleared. In this screen, the password unset icon is displayed.

With the screen displays of FIG. 16, even when the card password of the memory card 200 is forgotten, it is possible to delete the card password information on the inserted memory card 200 so that it becomes possible for the user to use the memory card 200. In addition, when the card password is newly set after the deletion, the memory card with high safety becomes usable again.

Figure 17:
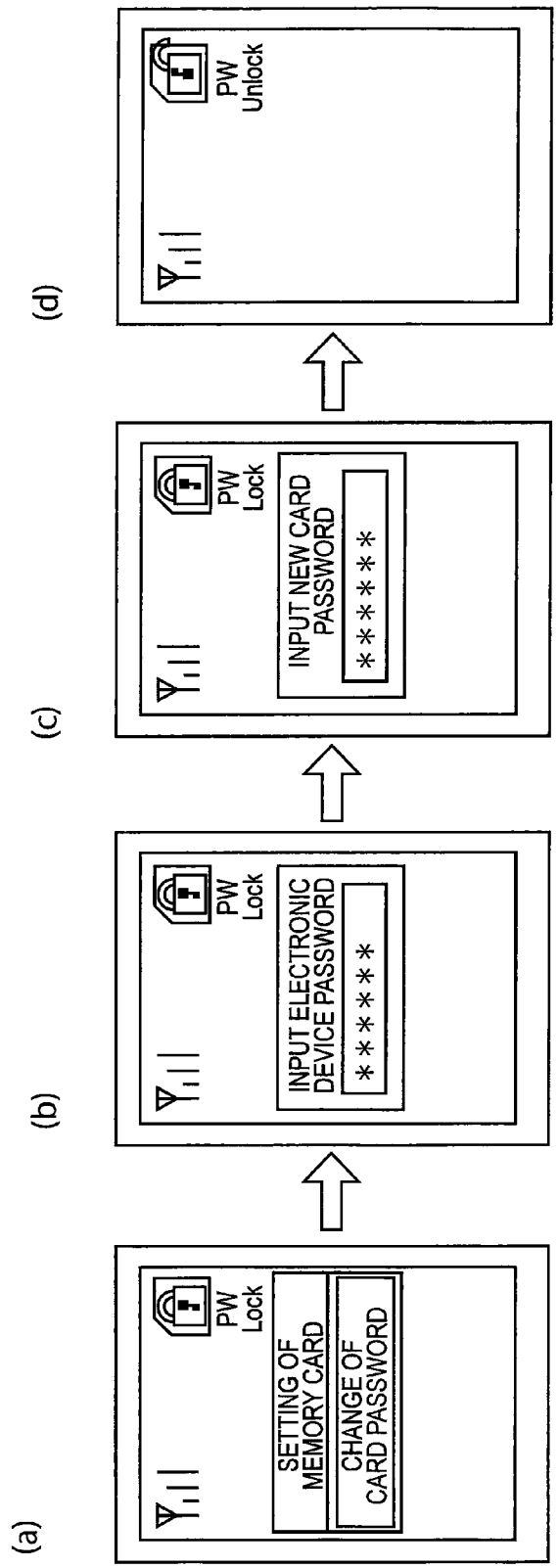
FIG. 17 shows examples of screen displays by the display part of the electronic device in the first embodiment of the present invention.

FIG. 17 shows examples of screen displays at the time of selection of the card password change (update) menu to be selected when the user forgets the card password.

With regard to a case where the electronic device 100 carries out the change of the card password, for example, when the user selects the card password change menu displayed in the display unit 110 as shown in (a) of FIG. 17 through the input unit 102, the change of the card password is carried out. In this screen, the lock icon is displayed.

Subsequently, as shown in (b) of FIG. 17, the display unit 110 displays the input screen of the device password. In this screen, the lock icon is continuously displayed.

When the inputted device password and the device password retained in the device password retention unit 112 match with each other, as shown in (c) of FIG. 17, the display unit 110 displays the input screen of a new password, and the control unit 109 transmits the password update signal described above to the memory card 200 to update the card password set in the memory card 200. In this screen, the lock icon is continuously displayed.

Then, as shown in (d) of FIG. 17, the display unit 110 updates the card password set in the memory card 200, and displays a screen denoting that the unlocking is completed. In this screen, the unlock icon is displayed. It is to be noted that the unlocking processing does not need to be performed simultaneously with the update of the password. In this case, as the icon of (d) in FIG. 17, the lock icon is displayed.

With the screen displays of FIG. 17, even when the card password of the memory card 200 is forgotten, the card password information on the inserted memory card 200 can be changed so that it becomes possible for the user to use the memory card 200. In addition, since the card password is newly set, the memory card with high safety becomes continuously usable.

According to such electronic device 100, even when the password of the external storage device of any type is forgotten, it is possible to safely obtain the password information without setting a sub-password.

Second Embodiment

Figure 18:
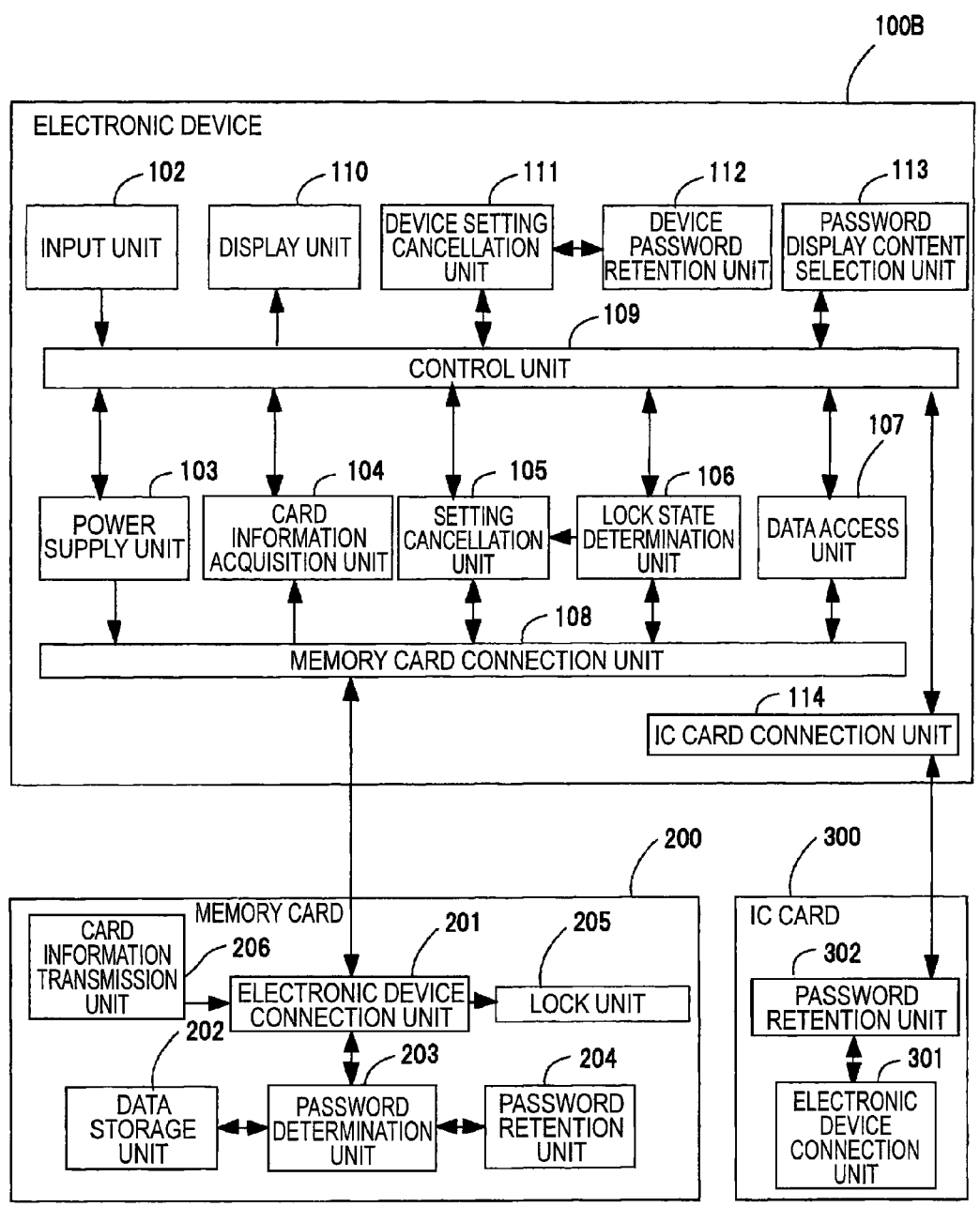
FIG. 18 shows examples of schematic configurations of an electronic device, the memory card, and an IC card in a second embodiment of the present invention.

FIG. 18 shows an example of schematic configurations of an electronic device 100B, the memory card 200, and an IC card 300 in a second embodiment of the present invention. In the electronic device 100B and the memory card 200, the description of the components which are the same as those in the configurations of the electronic device 100 and the memory card 200 shown in FIG. 1 will be omitted or simplified by retaining the same reference numerals. As the electronic device 100B, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

When compared with the components of the electronic device 100, the electronic device 100B does not have the password retention unit 101, and includes an IC card connection unit 114.

The IC card connection unit 114 is a unit for connecting the IC card 300, and is, e.g., the connection terminal. For example, the insertion of the IC card 300 into an IC card slot allows the data exchange with the IC card 300.

The IC card 300 is, e.g., a SIM (Subscriber Identity Module) card, and has a password retention unit 301 and an electronic device connection unit 302.

The password retention unit 301 has the function similar to that of the password retention unit 101 of the electronic device 100, and retains the card password. In addition, the password retention unit 301 may retain the password of the IC card 300 (hereinafter referred to as an IC password) together with the card password.

The electronic device connection unit 302 is a unit for the connection to the electronic device 100, and is, e.g., the connection terminal. For example, the IC card 300 is inserted into the IC card slot and the IC card connection unit 114 of the electronic device 100B and the electronic device connection unit 302 are connected to each other, whereby it becomes possible to perform the data exchange.

Next, a description will be given of an example of operations of the electronic device 100B. Similarly to the electronic device 100, the electronic device 100B also performs the processing of FIGS. 3 to 9. In addition, the electronic device 100B also performs the displays of FIGS. 10 to 17.

In the electronic device 100B, when the operation similar to the operation requiring the access to the password retention unit 101 in the electronic device 100 is performed, the control unit 109 transmits the access signal for getting access to the password retention unit 301 via the IC card connection unit 114. For example, when a reference, storage, deletion, change, or the like is performed with respect to the card password information, the access signal includes the card password and the control signal for performing the reference, storage, deletion, change, or the like.

According to such electronic device 100B, even when the IC card 300 such as the SIM card is inserted and used in another electronic device, by inputting the device password of the another electronic device, it becomes possible to display, delete, or change the card password. Consequently, even when the card password is forgotten, it is possible to continuously use the memory card 200.

In addition, instead of performing the input, storage, deletion, change, and read of the device password, the input, storage, change, and read of the IC password may be performed. In this case, the control unit 103 transmits the access signal for getting access to the password retention unit 301 via the IC card connection unit 114. The access signal includes, e.g., the IC password and the control signal.

By using the IC password instead of the device password, even when the IC card 300 such as the SIM card is inserted and used in another electronic device, it is possible to display, delete, or change the card password using the identical IC password.

Third Embodiment

Figure 19:
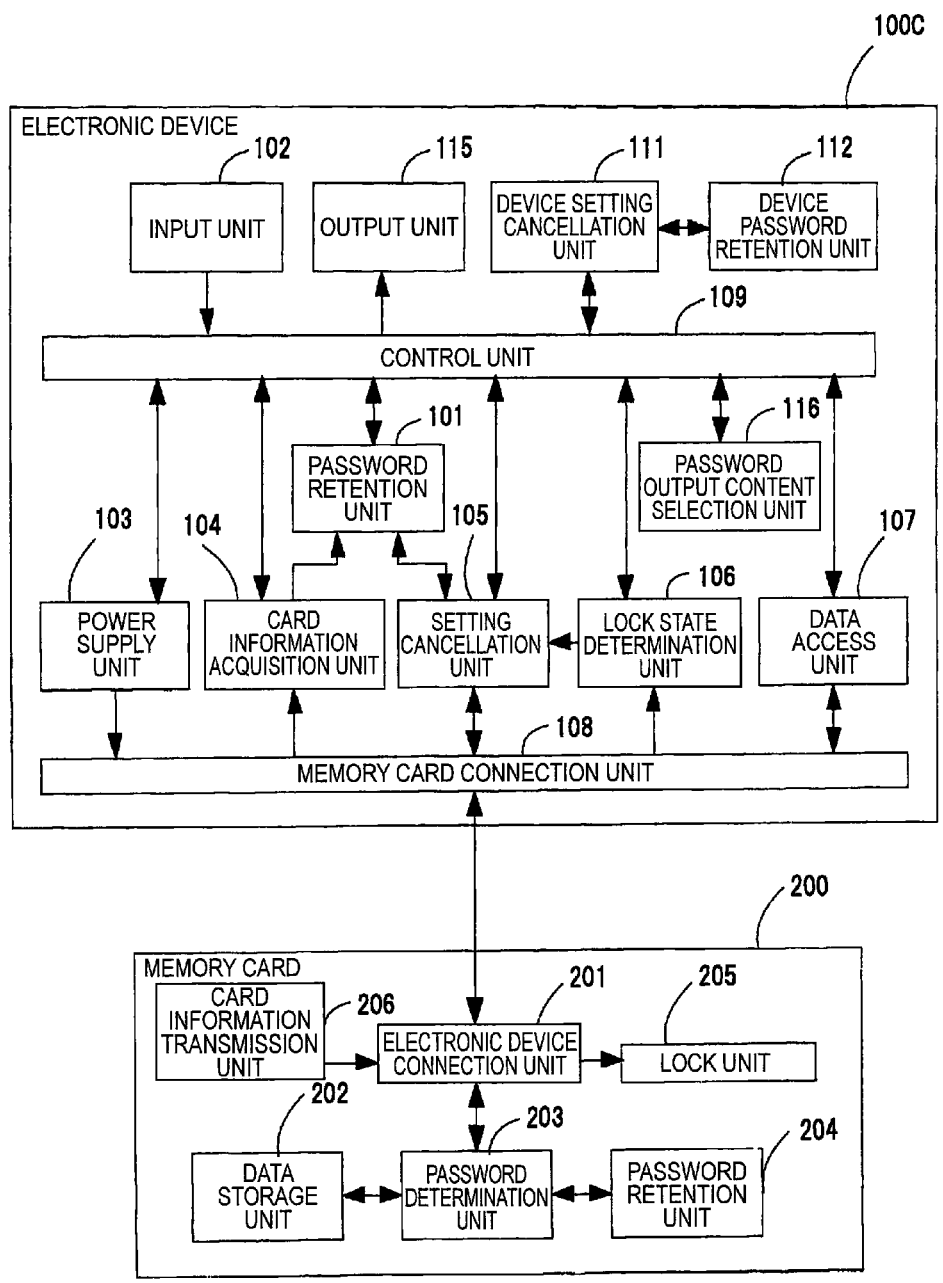
FIG. 19 shows examples of schematic configurations of an electronic device and the memory card in a third embodiment of the present invention.

FIG. 19 shows an example of schematic configurations of an electronic device 100C and the memory card 200 in a third embodiment of the present invention. In the electronic device 100C and the memory card 200, the description of the components which are the same as those in the configurations of the electronic device 100 and the memory card 200 shown in FIG. 1 will be omitted or simplified by retaining the same reference numerals. As the electronic device 100C, there can be considered the PC, the PDA, the portable telephone terminal, the television, the digital still camera, the digital video camera, the IC recorder, the printer, the AV player, the AV recorder, the HDD portable storage, the car navigation terminal, and other electronic devices each to which the external storage device such as the memory card 200 or the like can be connected.

When compared with the components of the electronic device 100, the electronic device 100C includes an output unit 115 in place of the display unit 110, and a password output content selection unit 116 in place of the password display content selection unit 113. It is to be noted that the password output content selection unit 116 has a function as "an output mode selection part".

The output unit 115 outputs various data to other external electronic devices and the like. In this case, for example, data output may be performed via a cable, the data output may be performed via short-distance wireless communication utilizing IrDA (Infared Data Association) or Bluetooth, or the data may be transmitted by e-mail. Further, as an output format, there may be used, e.g., a text format capable of pasting in an e-mail text, a format in which data is encrypted, or other formats. It is to be noted that the output unit 115 has a function as "an output change part".

The password display content selection unit 116 selects a content (output mode) to be outputted when the card password information is outputted using the input by the input unit 102 or the like. For example, the password output content selection unit 116 selects an all cards output mode outputting the card password information on all of the memory cards in addition to the card password information on the memory card currently connected to the electronic device 100, or a current card output mode outputting the card password information on only the memory card currently connected to the electronic device.

Next, a description will be given of an example of operations of the electronic device 100C. Similarly to the electronic device 100, the electronic device 100C also performs the processing of FIGS. 3 to 9.

In the electronic device 100C, the output unit 115 outputs the data displayed in the electronic device 100. In other words, instead of the displays of the information (the information in the password retention tables 101a and 101b of the password retention unit 101) performed by the display unit 110 in FIGS. 3 to 9, the output unit 115 outputs the information to other external electronic devices and the like. In addition, instead of the selection of the display mode performed by the password display content selection unit 113 in FIG. 9, the password output content selection unit 116 selects the output mode.

According to such electronic device 100C, it is not necessary to provide the display unit 102, it becomes possible to easily transmit only the card password information to other electronic devices, and the content can be ascertained and stored in other electronic devices so that convenience for the user is improved.

It is to be noted that the functions of the electronic devices in the first to third embodiments can be combined. For example, it becomes possible to output the card password information retained in the IC card retention unit 301 using the output unit 115, and ascertain and store the content in other electronic devices.

INDUSTRIAL APPLICABILITY

The present invention is useful for an electronic device, a program, and the like which are capable of safely obtaining password information even when a password of an external storage device of any type is forgotten.

The invention claimed is:

1. An electronic device comprising:
    an external storage device connection part connecting an external storage device capable of being locked by a password such that the electronic device is prevented from accessing data stored on the external storage device when the external storage device is locked;
    a password retention part retaining password information including the password of the external storage device;
    a user authentication key retention part retaining a user authentication key of the electronic device;
    an input part for inputting data;
    a user authentication key determination part determining that a user authentication key of the electronic device inputted by the input part and the user authentication key retained in the user authentication key retention part match with each other; and
    an output part displaying the password information retained in the password retention art on a display or outputting the password information retained in the password retention part to another device when the user authentication keys match with each other as a result of the determination by the user authentication key determination part, wherein
    the password retention part associates identification information on the external storage device with the password thereof and retains them as the password information.

2. The electronic device according to claim 1, wherein the output part refers to the password retention part and outputs the password information in correspondence to the identification information on the external storage device connected to the external storage device connection part.

3. The electronic device according to claim 2, further comprising:
    an output mode selection part selecting any one of a first output mode for outputting all of the password information retained in the password retention part and a second output mode for outputting the password information on the external storage device connected to the external storage device connection part.

4. The electronic device according to claim 2, wherein the output part suspends outputting of the password information when the identification information on the external storage device connected to the external storage device connection part is not retained in the password retention part.

5. The electronic device according to claim 1, wherein the output part transmits the password information when the user authentication keys match with each other as the result of the determination by the user authentication key determination part.

6. The electronic device according to claim 1, wherein the password information includes manufacturer information indicative of a manufacturer of the external storage device.

7. The electronic device according to claim 1, wherein the password information includes capacity information indicative of a capacity of the external storage device.

8. The electronic device according to claim 1, further comprising:
a password record part recording, when the password is not set in the external storage device connected to the external storage device connection part and when the password is newly set in the external storage device by inputting the password by the input unit, the inputted password in the password retention part.

9. The electronic device according to claim 1, further comprising:
a password record part recording, when the password of the external storage device set in the external storage device connected to the external storage device connection part and the password inputted by the input part match with each other and unlocking of a password lock of the external storage device is successfully performed, the matching password in the password retention part.

10. The electronic device according to claim 1, further comprising an IC card connection part connecting an IC card having the password retention part, wherein
the output part transmits an access signal for getting access to the IC card when any of data reference, and data record is performed with respect to the password retention part of the IC card.

11. A password control method, comprising:
an external storage device connection step of connecting, to an electronic device, an external storage device capable of being locked by a password such that the electronic device is prevented from accessing data stored on the external storage device when the external storage device is locked;
an input step of inputting data;
a user authentication key determination step of determining that a user authentication key of the electronic device inputted in the input step and a user authentication key retained in a user authentication key retention part for retaining the user authentication key of the electronic device match with each other; and
an output step of displaying, on a display, password information retained in a password retention part for retaining identification information of the external storage device and the password in association with each other as the password information or outputting the password information to another device when the user authentication keys match with each other as a result of the determination by the user authentication key determination step.

12. A non-transitory storage medium for storing a program for causing a computer to execute each step of a password control method, the method comprising:
an external storage device connection step of connecting, to an electronic device, an external storage device capable of being locked by a password such that the electronic device is prevented from accessing data stored on the external storage device when the external storage device is locked;
an input step of inputting data;
a user authentication key determination step of determining that a user authentication key of the electronic device inputted in the input step and a user authentication key retained in a user authentication key retention part for retaining the user authentication key of the electronic device match with each other; and
an output step of displaying, on a display, password information retained in a password retention part for retaining identification information of the external storage device and the password in association with each other as the password information or outputting the password information to another device when the user authentication keys match with each other as a result of the determination by the user authentication key determination step.

13. An electronic device comprising:
an external storage device connection part connecting an external storage device capable of being locked by a password such that the electronic device is prevented from accessing data stored on the external storage device when the external storage device is locked;
a password retention part retaining password information including the password of the external storage device;
a user authentication key retention part retaining a user authentication key of the electronic device;
an input part for inputting data;
a user authentication key determination part determining that a user authentication key of the electronic device inputted by the input part and the user authentication key retained in the user authentication key retention part match with each other; and
an output part outputting the password information retained in the password retention part to another external device when the user authentication keys match with each other as a result of the determination by the user authentication key determination part, wherein
the password retention part associates identification information on the external storage device with the password thereof and retains them as the password information.

* * * * *